US012712395B2

(12) United States Patent
Draak

(10) Patent No.: US 12,712,395 B2
(45) **Date of Patent: *Aug. 18, 2026**

(54) FOREIGN OBJECT DETECTION IN A WIRELESS POWER TRANSFER SYSTEM

(71) Applicant: KONINKLIJKE PHILIPS N.V., Eindhoven (NL)

(72) Inventor: Johannes Wilhelmus Draak, Horst (NL)

(73) Assignee: Koninklijke Philips N.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 18/775,166

(22) Filed: Jul. 17, 2024

(65) Prior Publication Data

US 2024/0372410 A1 Nov. 7, 2024

Related U.S. Application Data

(63) Continuation of application No. 17/926,639, filed as application No. PCT/EP2021/063315 on May 19, 2021, now Pat. No. 12,046,923.

(30) Foreign Application Priority Data

May 26, 2020 (EP) .................................... 20176582

(51) Int. Cl.
*H02J 50/60* (2016.01)
*H02J 50/80* (2016.01)
*H02J 50/10* (2016.01)

(52) U.S. Cl.
CPC ............. *H02J 50/60* (2016.02); *H02J 50/80* (2016.02); *H02J 50/10* (2016.02)

(58) Field of Classification Search
CPC ............. H02J 50/60; H02J 50/80; H02J 50/10
(Continued)

(56) References Cited

U.S. PATENT DOCUMENTS 8,169,185 B2 * 5/2012 Partovi ................. H02J 50/005 320/108
9,530,558 B2 * 12/2016 Nakano ................. G01V 3/101
(Continued)

FOREIGN PATENT DOCUMENTS

WO 2012127335 A1 9/2012
WO 2015018868 A1 2/2015

OTHER PUBLICATIONS

Qi Specification.
International Search Report and Written Opinion From PCT/EP2021/063315 Mailed Aug. 30, 2021.

*Primary Examiner* — Alfonso Perez Borroto

(57) ABSTRACT

A power transmitter comprises a transmitter coil generating an electromagnetic field. A set of balanced detection coils comprises detection coils in series and compensating each other. A foreign object detector performs foreign object detection, by potentially detecting a foreign object in response to a property of an output signal from the set of balanced detection coils in response to the electromagnetic test meeting a foreign object detection criterion. A communicator is coupled to a communication antenna communicates with a power receiver via this. The communication antenna comprises a plurality of communication coils coupled in parallel. A first segment of a first communication coil has a first coupling to a first detection coil and a second segment of a second coil has a second coupling to a second detection coil. The couplings are capacitive and/or inductive couplings and the first coupling and the second coupling compensate each other in the output signal.

28 Claims, 19 Drawing Sheets

(58) Field of Classification Search
USPC .......................................................... 307/104
See application file for complete search history.

(56) References Cited

U.S. PATENT DOCUMENTS

| | | | | |
|---|---|---|---|---|
| 10,270,296 | B2 * | 4/2019 | Cheikh | H02J 50/60 |
| 10,763,706 | B2 * | 9/2020 | Chen | H02J 50/60 |
| 12,046,923 | B2 * | 7/2024 | Draak | H01F 27/2871 |
| 2013/0169062 | A1 | 7/2013 | Maikawa et al. | |
| 2014/0111019 | A1 | 4/2014 | Roy | |
| 2014/0139038 | A1 * | 5/2014 | Konno | B60L 53/36<br>307/104 |
| 2014/0145514 | A1 * | 5/2014 | Konno | B60L 53/36<br>307/104 |
| 2014/0180612 | A1 * | 6/2014 | Rejman | H02J 7/751<br>320/108 |
| 2016/0006260 | A1 | 1/2016 | Nakamura et al. | |
| 2016/0149442 | A1 * | 5/2016 | Asanuma | G01V 3/10<br>307/104 |
| 2017/0033609 | A1 * | 2/2017 | Nakamura | H02J 50/12 |
| 2018/0083349 | A1 * | 3/2018 | Sieber | B60L 50/60 |
| 2019/0084434 | A1 * | 3/2019 | Yoshizaki | B60L 53/60 |
| 2019/0097471 | A1 * | 3/2019 | Pantic | H02J 50/90 |

* cited by examiner

FOREIGN OBJECT DETECTION IN A WIRELESS POWER TRANSFER SYSTEM

CROSS-REFERENCE TO PRIOR APPLICATIONS

This application is a continuation of U.S. patent application Ser. No. 17/926,639 filed May 19, 2021 which is the U.S. National Phase application under 35 U.S.C. § 371 of International Application No. PCT/EP2021/063315, filed on May 19, 2021, which claims the benefit of EP Patent Application No. EP 20176582.3, filed on May 26, 2020. These applications are hereby incorporated by reference herein.

FIELD OF THE INVENTION

The invention relates to foreign object detection in a wireless power transfer system and in particular, but not exclusively, to foreign object detection for a power transmitter providing inductive power transfer to higher power devices, such as e.g. kitchen appliances.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being further developed. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

A potential problem with wireless power transfer is that power may unintentionally be transferred to e.g. metallic objects that happen to be in the vicinity of the power transmitter. For example, if a foreign object, such as e.g. a coin, key, ring etc., is placed upon the power transmitter platform arranged to receive a power receiver, the magnetic flux generated by the transmitter coil will introduce eddy currents in the metal objects which will cause the objects to heat up. The heat increase may be very significant and may be highly disadvantageous.

In order to reduce the risk of such scenarios arising, it has been proposed to introduce foreign object detection where the power transmitter can detect the presence of a foreign object and reduce the transmit power and/or generate a user alert when a positive detection occurs. For example, the Qi system includes functionality for detecting a foreign object, and for reducing power if a foreign object is detected. Specifically, Qi specification version 1.2.1, section 11 describes various methods of detecting a foreign object.

One method to detect such foreign objects is disclosed in WO2015018868A1. Another example is provided in WO 2012127335 which discloses an approach based on determining unknown power losses. In the approach, both the power receiver and the power transmitter measure their power, and the receiver communicates its measured received power to the power transmitter. When the power transmitter detects a significant difference between the power sent by the transmitter and the power received by the receiver, an unwanted foreign object may potentially be present, and the power transfer may be reduced or aborted for safety reasons. This power loss method requires synchronized accurate power measurements performed by the power transmitter and the power receiver.

For example, in the Qi power transfer standard, the power receiver estimates its received power e.g. by measuring the rectified voltage and current, multiplying them and adding an estimate of the internal power losses in the power receiver (e.g. losses of the rectifier, the receiver coil, metal parts being part of the receiver etc.). The power receiver reports the determined received power to the power transmitter with a minimum rate of e.g. every four seconds.

The power transmitter estimates its transmitted power, e.g. by measuring the DC input voltage and current of the inverter, multiplying them and correcting the result by subtracting an estimation of the internal power losses in the transmitter, such as e.g. the estimated power loss in the inverter, the primary coil, and metal parts that are part of the power transmitter.

The power transmitter can estimate the power loss by subtracting the reported received power from the transmitted power. If the difference exceeds a threshold, the transmitter will assume that too much power is dissipated in a foreign object, and it can then proceed to terminate the power transfer.

Alternatively, it has been proposed to measure the quality or Q-factor of the resonant circuit formed by the primary coil and secondary coil together with the corresponding capacitances and resistances. A reduction in the measured Q-factor may be indicative of a foreign object being present. This approach is often used prior to power transfer.

In practice, it tends to be difficult to achieve sufficient detection accuracy using the methods described in the Qi specification. This difficulty is exacerbated by a number of uncertainties about the specific current operating conditions.

For example, a particular problem is the potential presence of friendly metals (i.e. metal parts of the device that embodies the power receiver or the power transmitter) as the magnetic and electrical properties of these may be unknown (and vary between different devices) and therefore may be difficult to compensate for.

Further, undesirable heating may result from even relatively small amounts of power being dissipated in a metallic foreign object. Therefore, it is necessary to detect even a small power discrepancy between the transmitted and received power, and this may be particularly difficult when the power levels of the power transfer increase.

The Q factor degradation approach may in many scenarios have a better sensitivity for detecting the presence of metal objects. However, it may still not provide sufficient accuracy and e.g. may also suffer from the influence of friendly metal.

The performance of the foreign object detection is subject to the specific operating conditions that are present when the test is actually performed. For example, if, as described in the Qi specification, a measurement for foreign object detection is performed in the Selection Phase of a power transfer initialization process, the signal that the power transmitter provides for the measurement must be small enough to prevent that it wakes up the power receiver. However, for such a small signal, the signal/noise ratio is typically poor, resulting in reduced accuracy of the measurement.

Another issue is that foreign object detection is typically a very sensitive test where it is desired that relatively small changes caused by the presence of a foreign object is detected in an environment with possibly a large variation of the operating conditions and scenarios for which the test is being performed.

The problems tend to be exacerbated for higher power levels and the current developments for wireless power trends tend to be towards higher power level transfers. For example, the Wireless Power Consortium is developing the Cordless Kitchen Specification which is intended to support high power levels up to 2.5 kW or potentially even higher. For higher power levels, the foreign object detection algorithms need to be more accurate to prevent heating of foreign objects above a safe temperature. Indeed, the temperature rise is given by the absolute power level, and thus for higher power level the relative power loss that needs to be detected may be reduced substantially.

A further challenge to foreign object detection is that metallic parts of the power transmitter and power receiver interfere with the detection and make it more difficult to detect the presence of other metallic objects.

Such issues may be exacerbated by the fact that some other functions may utilize metallic parts. Specifically, the power transfer is typically achieved via power transfer coils that are often relatively large and therefore may have a significant impact on the foreign object detection. In situations where the foreign object detection is performed using a dedicated foreign object detection antenna or coil, the design of the power transfer devices may seek to minimize the impact of the power transfer coils by keeping these at a distance to each other or e.g. by a magnetic shielding being implemented between them. However, this may be difficult to achieve as it often conflicts with the desire to position the power transfer coils of the two devices in close proximity.

Similarly, in many power transfer systems, communication between the power transfer devices may be achieved by dedicated communication antennas. For example, NFC communication may be implemented that employ dedicated NFC communication coils. These may be desired to be positioned close to each other which may restrict the design freedom in minimizing the impact on the foreign object detection.

Current approaches for foreign object detection and communication in power transmitters tend to be suboptimal and may in some scenarios and examples provide less than optimum performance. The interaction between foreign object detection and communication functionality may often result in degraded communication performance (e.g. due to suboptimal coupling between communication antennas) and/or reduced foreign object detection performance (e.g. due to the impact of communication antennas close to foreign object detection antennas). In particular, current approaches may result in the presence of foreign objects not being detected, or in false detections of foreign objects when none are present. Further, more accurate approaches tend to be complex and expensive.

Hence, an improved foreign object detection and/or communication for power transmitters would be advantageous and, in particular, an approach allowing increased flexibility, reduced cost, reduced complexity, improved foreign object detection, fewer false detections and missed detections, backwards compatibility, improved suitability for higher power level transfers, improved communication, reduced impact of communication antennas on foreign object detection, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided power transmitter for transferring power to a power receiver via an inductive power transfer signal, the power transmitter comprising: a transmitter coil arranged to generate an electromagnetic test field for foreign object detection; a set of balanced detection coils comprising two detection coils coupled in series and such that signals induced in the two detection coils by the electromagnetic test field compensate each other; a foreign object detector coupled to the set of balanced detection coils and arranged to perform foreign object detection, the foreign object detector being arranged to detect a foreign object in response to a property of an output signal from the set of balanced detection coils meeting a foreign object detection criterion; a communication antenna; a communicator coupled to the communication antenna and arranged to communicate with the power receiver via the communication antenna; wherein the communication antenna comprises at least a first communication coil and a second communication coil coupled in parallel, the communication antenna being arranged with a first segment of the first communication coil having a first coupling to the first detection coil and a second segment of the second coil having a second coupling to the second detection coil, the first coupling and the second coupling being at least one of capacitive couplings and inductive couplings and the first coupling and the second coupling compensating each other in the output signal.

The invention may provide improved foreign object detection in many embodiments. In many scenarios and systems, a more accurate foreign object detection may be achieved. The approach may in many embodiments reduce complexity. Specifically, the approach may be particularly suitable for improving foreign object detection in higher power level power transfer systems.

The approach may allow improved accuracy and/or reliability of foreign object detection tests during the power transfer phase. In many embodiments, the approach may reduce uncertainty for the foreign object detection tests thereby improving performance. The approach may provide a particularly efficient approach for improving detection accuracy when using balanced detection coils.

The approach may allow a highly efficient power transfer and/or communication functionality in many embodiments, and may specifically allow improved coupling between the power transfer coils and/or communication antennae of the power transmitter and power receiver.

The approach may in many embodiments allow an advantageous implementation and may typically allow compact implementation e.g. using planer coils that for example may be implemented in different layers of a multi-layer printed circuit board.

The detection coils are balanced in that the detection coils are arranged such that signals induced in the two detection coils by an electromagnetic field generated by the transmitter coil compensate each other. The compensating may be such that the combined voltage over the two balanced detection coils is lower than the largest of the voltages over each of the two balanced detection coils. The compensation may be an at least partial cancellation of the two signals.

The foreign object detector may be arranged to determine that a foreign object is detected if a phase and/or amplitude signal from the detection coils exceeds a threshold.

The electromagnetic test signal may also be referred to as a test electromagnetic field and the terms may be considered interchangeable. The detection coils/winding being coupled in series means that the current through the detection coils/winding is identical.

A combined resistance of a coupling between the set of balanced detection coils may be less than 100 Ohm.

The signals induced in the two detection coils by the electromagnetic test field compensating each other may reflect that the signals at least partially cancel each other. The compensating may reduce the (combined) signal amplitude of the output signal relative to a largest amplitude of the individual signals induced in the two coils. The couplings compensating each other may reflect that the couplings at least partially cancel each other in the output signal. The compensating may reduce the (combined) signal amplitude of coupling signal components in the output signal relative to a largest amplitude of coupling signal components of the individual couplings.

In accordance with an optional feature of the invention, the first coupling includes both a capacitive coupling and an inductive coupling and the second coupling includes both a capacitive coupling and an inductive coupling.

The approach may allow advantageous operation and typically improved foreign object detection, power transfer and/or communication by compensating for both inductive and capacitive coupling between foreign object detection coils and a communication antenna.

In accordance with an optional feature of the invention, the communication is arranged such that a first signal component induced in the first detection coil from a current in the first communication coil is compensated in the output signal by a second signal component induced in the second detection coil from a current in the second communication coil.

The approach may allow advantageous operation and typically improved foreign object detection.

In accordance with an optional feature of the invention, a current direction in the first segment relative to a current direction in the first detection coil is opposite a current direction in the second segment relative to a current direction in the second detection coil.

The approach may allow advantageous operation and typically improved foreign object detection. This may specifically be the case during foreign object detection.

In accordance with an optional feature of the invention, the first communication coil and the second communication coil are arranged such that a spatial relationship between the first communication coil and the first detection coil corresponds to a spatial relationship between the second communication coil and the second detection coil.

The approach may allow advantageous operation and typically improved foreign object detection. The spatial relationships may correspond to each other by being the same/identical. The spatial relationships may be transformed into each other using only translation, rotation, and mirror transformations.

In accordance with an optional feature of the invention, a voltage potential for the first segment matches a voltage potential for the second segment.

This may specifically be the case during foreign object detection. The approach may allow advantageous operation and typically improved foreign object detection and may specifically result in close matching of capacitive couplings in many embodiments. The voltage potential may be an average voltage potential over the segments. The voltage potentials may match by being substantially identical, such as e.g. within 10% or 5% of each other.

In some embodiments, a voltage distribution for the first segment matches a voltage distribution for the second segment. This may specifically be the case during foreign object detection.

In some embodiments, a voltage distribution in the first communication coil relative to the first detection coil is symmetric with a voltage distribution in the second communication coil relative to the second detection coil. This may specifically be the case during foreign object detection.

The approach may allow advantageous operation and typically improved foreign object detection.

In some embodiments, the first communication coil and the second communication coil are arranged such that a spatial relationship between the first segment and the first detection coil corresponds to a spatial relationship between the second segment and the second detection coil.

The approach may allow advantageous operation and typically improved foreign object detection. The spatial relationships may correspond to each other by being the same/identical. The spatial relationships may be transformed into each other using only translation, rotation, and mirror transformations.

In some embodiments, an orientation of the first segment relative to the first detection coil matches an orientation of the second segment relative to the second detection coil.

In some embodiments, a direction of current in the first segment relative to the first detection coil matches a direction of current in the second segment relative to the second detection coil.

In accordance with an optional feature of the invention, the first communication coil and the second communication coil have substantially identical spatial configurations and the first segment and second segment are corresponding segments of the first detection coil and the second detection coil.

This may allow advantageous operation.

In some embodiments, the first communication coil and the second communication coil have substantially identical spatial configurations and the first segment and second segment are the same segments of the first detection coil and the second detection coil.

In accordance with an optional feature of the invention, the set of balanced detection coils is formed in a first plane and the communication coils are planer coils formed in a second plane substantially parallel to the first plane.

This may provide particularly advantageous operation and/or implementation in many embodiments. The planes may be substantially parallel with a relative angle between them of no more than 10°, 5°, or 3°.

In accordance with an optional feature of the invention, the first detection coil spans a first area in the first plane and the second detection coil spans a second area in the first plane and an orthogonal projection of the first segment on the first plane has a same spatial relationship relative to the first area as a spatial relationship of an orthogonal projection of the second segment on the first plane relative to the second area.

This may provide particularly advantageous operation and/or implementation in many embodiments.

In accordance with an optional feature of the invention, the first detection coil spans a first area in the first plane and the second detection coil spans a second area in the first plane and an orthogonal projection of the first communication coil onto the first area matches an orthogonal projection of the second communication coil onto the second area.

This may provide particularly advantageous operation and/or implementation in many embodiments.

In some embodiments, the first detection coil and the second detection coil are rotationally symmetric around a rotation point, and the first communication coil and the second communication coil are further rotationally symmetric around the rotation point.

This may provide particularly advantageous operation and/or implementation in many embodiments.

In accordance with an optional feature of the invention, the first detection coil and the second detection coil are rotationally symmetric around a rotation point, and the first segment and the second segment are further rotationally symmetric around the rotation point.

This may provide particularly advantageous operation and/or implementation in many embodiments.

In accordance with an optional feature of the invention, the power transmitter comprises a plurality of sets of balanced detection coils, each set of balanced detection coils comprising at least two detection coils, the detection coils being rotationally symmetric around a rotation point and each detection coil spanning an angular interval; and wherein each of the first communication coil and the second communication coil comprises segments distributed along concentric closed curves surrounding the rotation point and being symmetric for rotation around the rotation point between angular intervals of detection coils of one set of balanced detection coils; and segments within an angular interval spanned by one detection coil of a set of balanced detection coils is rotationally symmetric with segments within an angular interval spanned by another detection coil of a set of balanced detection coils.

This may provide particularly advantageous operation and/or implementation in many embodiments.

In accordance with an optional feature of the invention, each angular interval comprises a plurality of segments distributed along different closed curves for each of the first communication coil and the second communication coils.

This may provide particularly advantageous operation and/or implementation in many embodiments.

In some embodiments, adjacent segments of a detection coil distributed along different closed curves are coupled via substantially radial segments of the detection coil relative to the rotation point.

This may provide particularly advantageous operation and/or implementation in many embodiments.

In some embodiments, the concentric closed curves are circles.

This may provide particularly advantageous operation and/or implementation in many embodiments.

In accordance with an optional feature of the invention, different segments of adjacent angular intervals are distributed along different curves of the concentric closed curves.

This may provide particularly advantageous operation and/or implementation in many embodiments.

In accordance with another aspect of the invention, there is provided method of a power transmitter transferring power from a power transmitter to a power receiver via an inductive power transfer signal, the method comprising: providing a transmitter coil for generating an electromagnetic test field for foreign object detection; providing a set of balanced detection coils comprising two detection coils coupled in series and arranged such that signals induced in the two detection coils by the electromagnetic test field compensate each other; providing a foreign object detector coupled to the set of balanced detection coils and arranged to perform foreign object detection, the foreign object detector being arranged to detect a foreign object in response to a property of an output signal from the set of balanced detection coils meeting a foreign object detection criterion; providing a communication antenna; and providing a communicator coupled to the communication antenna and arranged to communicate with the power receiver via the communication antenna; wherein the communication antenna comprises at least a first communication coil and a second communication coil coupled in parallel with the first communication coil, the communication antenna being arranged with a first segment of the first communication coil having a first capacitive coupling to the first detection coil and a second segment of the second coil having a second capacitive coupling to the second detection coil, the first coupling and the second coupling being at least one of a capacitive couplings and inductive couplings and the first coupling and the second coupling compensating each other in the output signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi specification or the Cordless Kitchen Specification. However, it will be appreciated that the invention is not limited to this application but may be applied to many other wireless power transfer systems.

Figure 1:
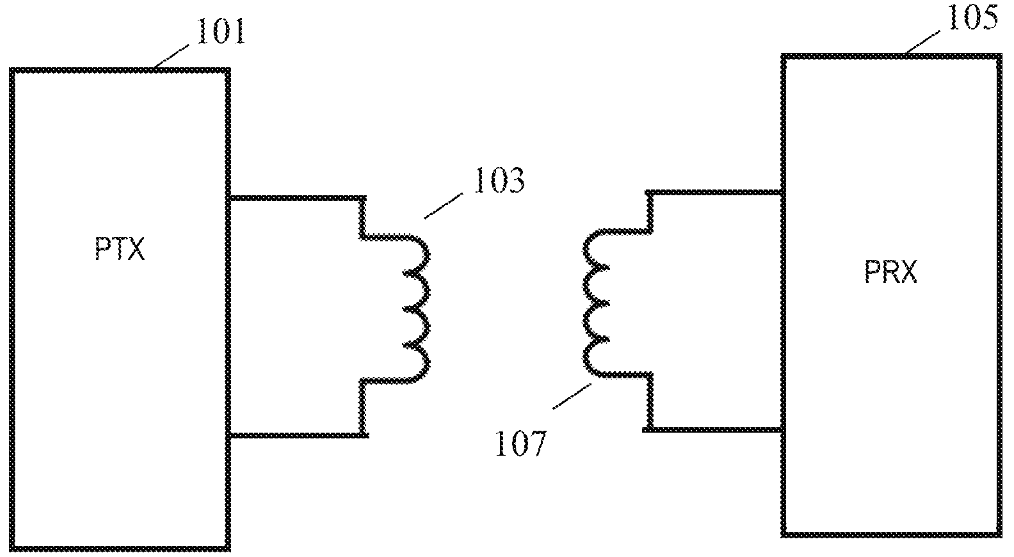
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 1000 W for very high power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

In wireless power transfer systems, the presence of an object (typically a conductive element extracting power from the power transfer signal and not being part of the power transmitter 101 or the power receiver 105, i.e. being an unintended, undesired, and/or interfering element to the power transfer) may be highly disadvantageous during a power transfer. Such an undesired object is in the field known as a foreign object.

A foreign object may not only reduce efficiency by adding a power loss to the operation but may also degrade the power transfer operation itself (e.g. by interfering with the power transfer efficiency or extracting power not directly controlled e.g. by the power transfer loop). In addition, the induction of currents in the foreign object (specifically eddy currents in the metal part of a foreign object) may result in an often highly undesirable heating of the foreign object.

In order to address such scenarios, wireless power transfer systems such as Qi or the Cordless Kitchen Specification include functionality for foreign object detection. Specifically, the power transmitter comprises functionality seeking to detect whether a foreign object is present. If so, the power transmitter may e.g. terminate the power transfer or reduce the maximum amount of power that can be transferred.

Foreign object detection may be performed before a power receiver enters the power transfer phase (e.g. during the initialization of the power transfer) or during the power transfer phase. Detection during the power transfer phase is often based on comparisons of measured transmitted power and received power whereas detection that take place before the power transfer phase is often based on measurements of a reflected impedance, e.g. by measuring the quality factor of the transmitter coil by using a small measurement signal.

Current approaches proposed by the Qi Specifications are based on detecting a power loss (by comparing the transmitted and the reported received power) or detecting degradations in the quality Q of the output resonance circuit. However, in current use these approaches have been found to provide suboptimal performance in many scenarios, and they may specifically lead to inaccurate detection resulting in missed detections and/or false positives where a foreign object is detected despite no such object being present.

Conventional foreign object detection tends to be suboptimal, partly due to variations and uncertainties in the specific operating conditions and scenarios in which the foreign object detection is performed, including variations and uncertainties in the power transmitter properties, power receiver properties, test conditions applied etc.

An example of the challenges to foreign object detection tests is the requirement to perform sufficiently accurate measurements in order to achieve a sufficiently reliable foreign object detection. This may lead to a desire to generate as powerful a signal as possible in order to increase the detection accuracy. However, this may increase power consumption in the power receiver and in any foreign object present. The detection performance may be sensitive to the specific signal level applied and there will typically be conflicting requirements.

The system of FIG. 1 uses an approach for foreign object detection that seeks to provide improved trade-offs for foreign object detection. The approach may in many embodiments provide improved foreign object detection and specifically may in many embodiments provide a more accurate and/or reliable foreign object detection. The approach may further allow low complexity and low resource requirements.

As will be described in more detail in the following, the approach utilizes a time division approach during the power transfer phase wherein foreign object detection and power transfer may e.g. be performed in separate time intervals thereby allowing the interference between these (specifically the impact of the power transfer on the foreign object detection) to be reduced substantially.

In the following, the system of FIG. 1 will be described in more detail. In the example, the electromagnetic power transfer signal and the electromagnetic test signal used for the foreign object detection are generated by the same coil. Further, the signals/fields will be referred to by different terms, namely the electromagnetic signal/field generated during power transfer time intervals will be referred to as the power transfer signal and the electromagnetic signal/field generated during foreign object detection time intervals will be referred to as the electromagnetic test signal, or just the test signal. In some cases where time division between power transfer and foreign object detection is not employed, the power transfer signal itself may also be used as the electromagnetic test signal.

Figure 2:
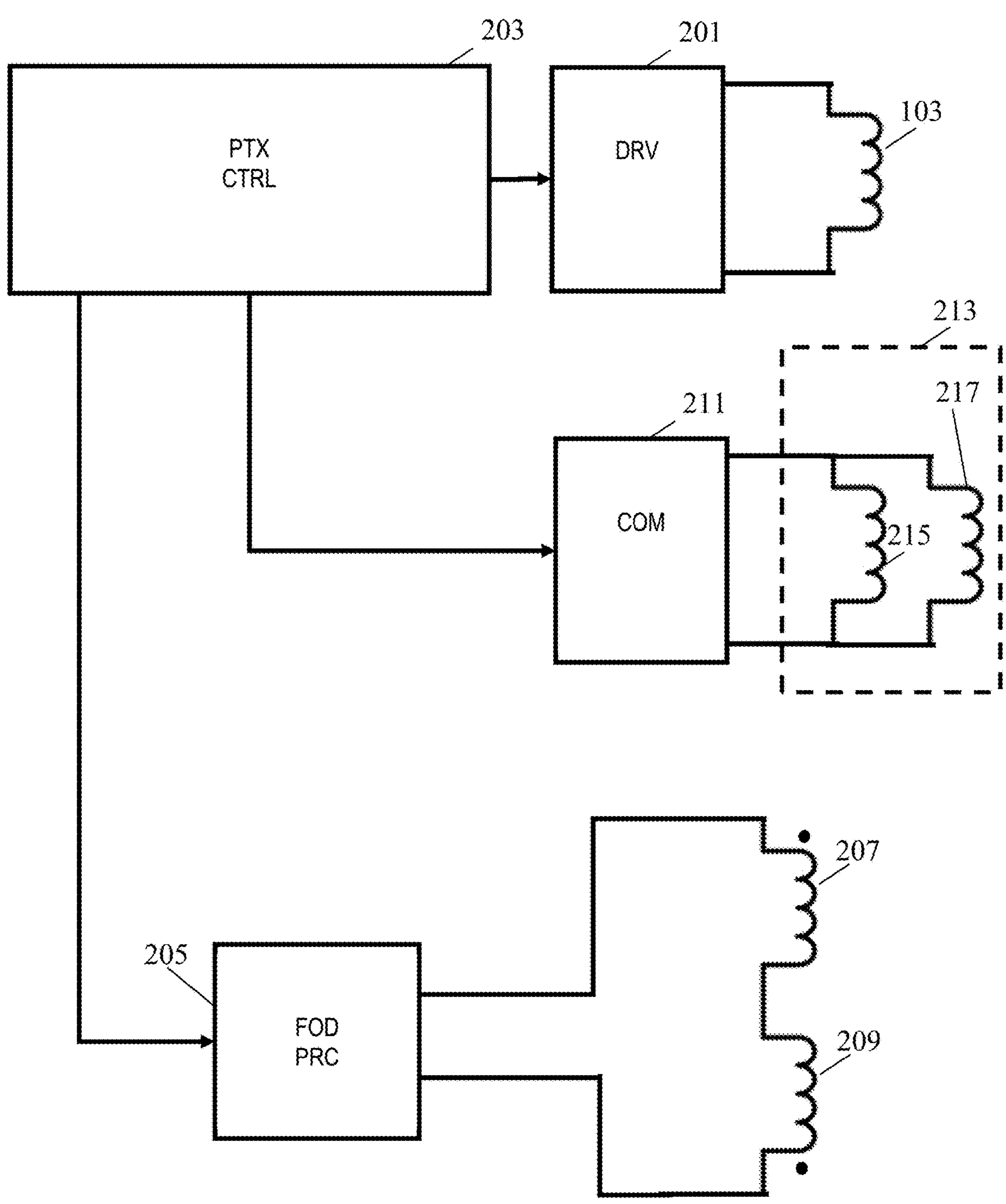
FIG. 2 illustrates an example of elements of a power transmitter in accordance with some embodiments of the invention.

FIG. 2 illustrates elements of the power transmitter 101 of FIG. 1 in more detail.

The power transmitter 101 includes a driver 201 which can generate a drive signal that is fed to the transmitter coil 103 which in return generates the electromagnetic power transfer signal thereby providing a power transfer to the power receiver 105. The power transfer signal is provided during power transfer time intervals of the power transfer phase.

Figure 3:
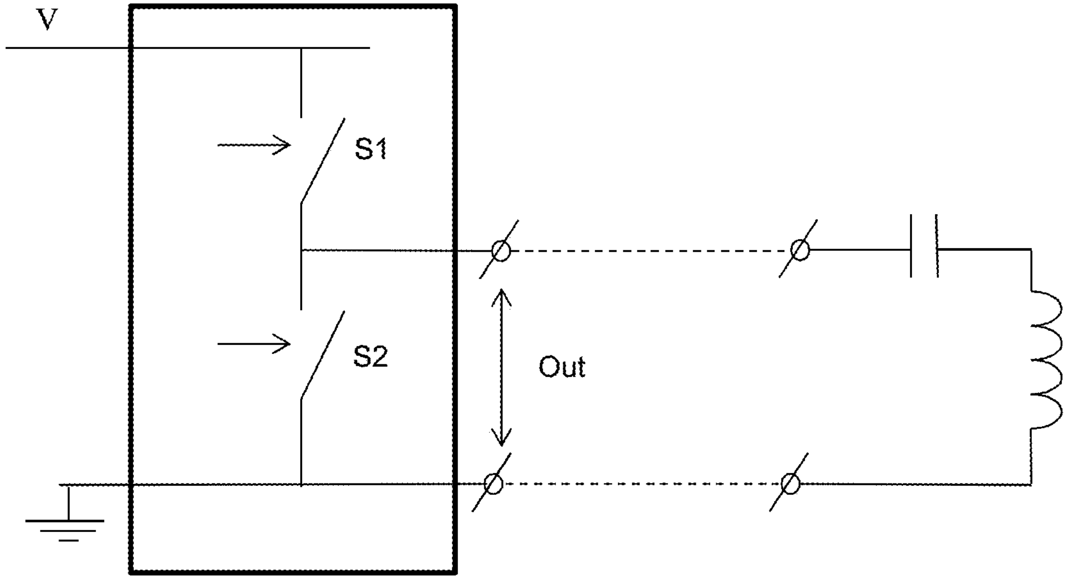
FIG. 3 illustrates an example of a half bridge inverter for a power transmitter.
Figure 4:
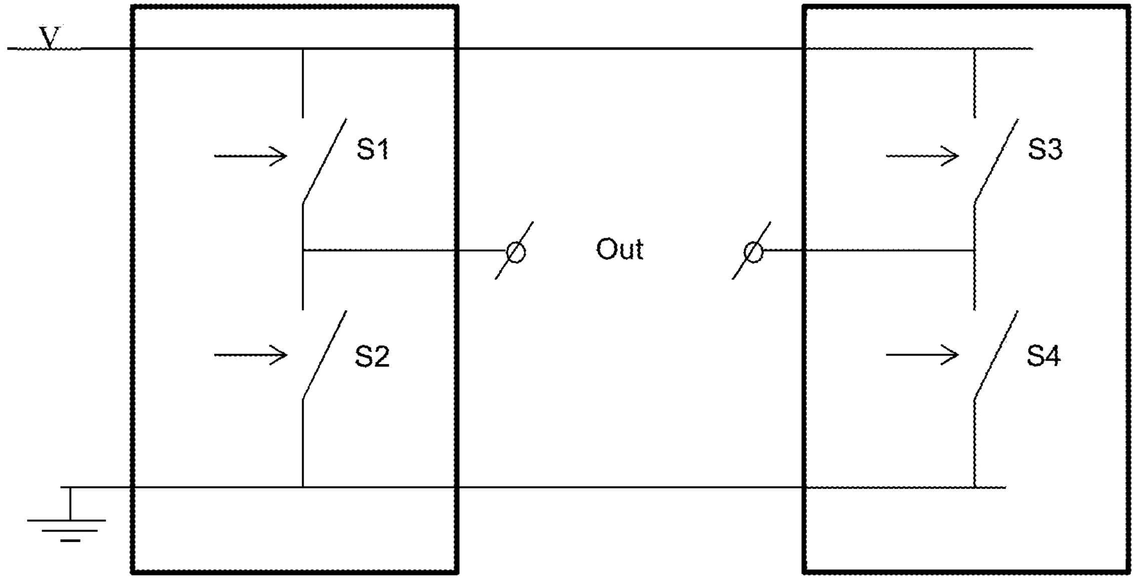
FIG. 4 illustrates an example of a full bridge inverter for a power transmitter.

The driver 201 generates the current and voltage which is fed to the transmitter inductor 103. The driver 201 is typically a drive circuit in the form of an inverter which generates an alternating signal from a DC Voltage. The output of the driver 201 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are opened and closed with the desired frequency.

The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi Specifications or the Cordless Kitchen Specification.

The power transmitter controller 203 is in particular arranged to control the generation of the drive signal by the driver 201, and it can specifically control the power level of the drive signal, and accordingly the level of the generated power transfer signal. The power transmitter controller 203 comprises a power loop controller controlling a power level of the power transfer signal in response to the power control messages received from the power receiver 105 during the power control phase.

The system of FIG. 1 uses an approach for foreign object detection that seeks to adapt operation to provide improved trade-offs for foreign object detection. The approach may in many embodiments provide improved foreign object detection and specifically may in many embodiments provide a more accurate and/or reliable foreign object detection. The approach may further allow low complexity and low resource requirements.

In the example, the driver 201 and the transmitter coil 103 are arranged to generate both an electromagnetic power transfer signal for the purpose of transferring power to a power receiver and an electromagnetic test signal used for foreign object detection. In systems not employing time division, the power transfer signal may also be used as an electromagnetic test signal or field.

Figure 5:
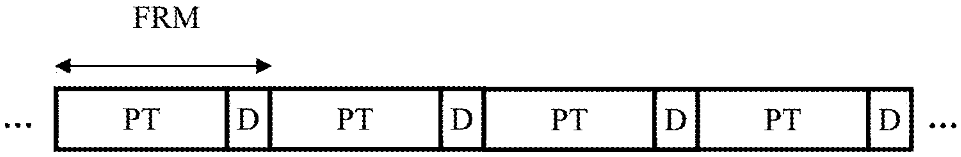
FIG. 5 illustrates an example of a time frame for the wireless power transfer system of FIG. 1.

However, in the example, the power transmitter may employ a repeating time frame for the drive signal during the power transfer phase where the time frame comprises at least one power transfer time interval and one foreign object detection time interval. An example of such a repeating time frame is illustrated in FIG. 5 where power transfer time intervals are indicated by PT and foreign object detection time intervals are indicated by D. In the example, each time frame FRM comprises only one foreign object detection time interval and one power transfer time interval and these (as well as the time frame itself) have the same duration in each frame. However, it will be appreciated that in other embodiments, other time intervals may also be included in a time frame (such as e.g. communication intervals) or a plurality of foreign object detection time intervals and/or power transfer time intervals may be included in each time frame. Furthermore, the duration of the different time intervals (and indeed the time frame itself) may in some embodiments vary dynamically. In some embodiments, the system may not employ a repeating time frame, and may not apply foreign object detection time intervals or power transfer intervals. In some such embodiments, foreign object detection may be performed simultaneously with the power transfer and/or with communication.

However, in the approach described in the following, the foreign object detection and the power transfer is separated in the time domain thereby resulting in reduced cross-interference from the power transfer to the foreign object detection. Thus, the variability and uncertainty resulting from variations in the operating conditions for the power transfer can be isolated from the foreign object detection resulting in a more reliable and accurate foreign object detection.

In the power transfer phase, the power transmitter is thus arranged to perform power transfer during the power transfer time interval of the time frames. Specifically, during these time intervals, the power transmitter 101 and the power receiver 105 may operate a power control loop (the power control loop may be based on communication within the power transfer time interval or may e.g. be based on communication outside of the power transfer time interval, such as in dedicated communication time intervals which may be overlapping or identical to the foreign object detection time intervals). Thus, the level of the power being transferred may be dynamically varied. In the foreign object detection time intervals of the time frames of the power transfer phase, at least one parameter of the drive signal, and thus of the electromagnetic test signal, is typically set to a predetermined value, or e.g. a value determined during an adaptation operation performed prior to the foreign object detection time interval. Thus, in the foreign object detection time interval, the parameter may be set to a predetermined value (i.e. being determined prior to the foreign object detection time interval, and often prior to the power transfer phase). In contrast, the parameter may not be constrained to this predetermined value during power transfer time intervals.

For example, during power transfer time intervals, the system may operate a power control loop which allows the power level of the power transfer signal to be varied in response to power control messages from the power receiver. The power control loop may control/change at least one of a current, voltage, and frequency of the drive signal/power transfer signal. In contrast, during a foreign object detection time interval, the parameter varied by the power control loop during the power transfer time interval may be set to a predetermined value for the current, voltage and/or frequency determined prior to the power transfer phase.

In many embodiments, a constant (typically lower) amplitude (typically voltage) of the drive signal is set during the foreign object detection time intervals. Additionally or alternatively, a predetermined frequency may be set for the drive signal during the foreign object detection time interval and this may typically be substantially higher than the drive signal during the power transfer time intervals.

As a result, in the time division approach the generated electromagnetic signal during the power transfer time intervals, the power transfer signal, typically has substantially different properties than the generated electromagnetic signal during the foreign object detection time intervals, the electromagnetic test signal. The electromagnetic signal or field generated during power transfer time intervals will be referred to as the power transfer signal and the electromagnetic signal or field generated during foreign object detection time intervals will be referred to as the electromagnetic test signal, or just the test signal. However, it will be appreciated that in the system of FIG. 2, the electromagnetic signal is generated from the same coil in both the power transfer time interval and the foreign object detection time interval, and indeed the same driver etc. is used for both the power transfer time interval and the foreign object detection time interval. Indeed, the references to the test signal may in many embodiments be considered equivalent to the power transfer signal during the foreign object detection time interval. In other embodiments, the power transfer signal and the electromagnetic test signal may be generated by different circuits and/or different coils.

The power transmitter 101 comprises a foreign object detector 205 which is arranged to perform foreign object detection tests, i.e. to specifically detect whether any undesired conductive elements are likely to be present within the generated electromagnetic field.

During an interval in which foreign object detection is performed, i.e. during a foreign object detection time interval, the foreign object detector 205 thus evaluates conditions to determine whether a foreign object is considered present or not. During the foreign object detection time interval, the power transmitter 101 generates an electromagnetic test signal and the foreign object detection is based on evaluating characteristics and properties of this signal.

In the system, the foreign object detection is based on detecting signals induced by the electromagnetic test signal in a set of balanced detection coils which comprises at least two detection coils 207, 209 that are arranged such that they negatively offset each other in the presence of a homogenous magnetic field, and (/or) in the presence of an electromagnetic field generated by the transmitter coil 103, such as specifically the electromagnetic test signal. Specifically, the power transmitter comprises a first detection coil 207 and a second detection coil 209 which are coupled such that electromagnetic field generated by the transmitter coil (at least partially) compensate each other.

Thus, the electromagnetic field generated by the transmitter coil 103 will induce a signal in the first detection coil 207 and will induce a signal in the second detection coil 209. However, the induced voltages will have opposite polarity such that the voltage (amplitude) of the series coupling of the detection coils 207, 209 resulting from the electromagnetic field generated by the transmitter coil 103 is lower than the voltage (amplitude) over at least the largest and typically of either of the individual detection coils 207, 209 resulting from the electromagnetic field generated by the transmitter coil 103. Thus, the first detection coil 207 and second detection coil 209 are coupled such that the induced voltages from the electromagnetic field generated by the transmitter coil 103 at least partially cancel each other. Compensation of two signals may thus result in a reduced signal amplitude of the combined signal and specifically in an at least partial compensation.

The detections coils may be arranged such that an amplitude of combined signal (typically voltage signal) from the two detection coils in the presence of homogenous electromagnetic field (or the electromagnetic field generated by the transmitter coil 103) is less than the amplitude of each of the individual signals of the detection coils. In many embodiments, the voltage over the series of the two detection coils is less than a voltage amplitude of the voltage over the detection coil having the largest voltage amplitude.

The detection coils are specifically arranged to correspond to at least two windings/coils in which opposing signals are generated by the electromagnetic test signal when no foreign objects are present. The opposing signals may thus at least partially cancel each other and accordingly the level of the measured induced signal across the series coupling of the detection coils 207, 209 will be reduced, and potentially substantially be cancelled. This may allow much increased magnetic field strengths to be used for the foreign object detection. Indeed, in many embodiments and scenarios, the resulting induced voltage may (ideally) be due only to differences in magnetic flux between the windings. Such differences or asymmetry between the windings may be caused by foreign objects and thus a more accurate measurement of the effect of a foreign object on the magnetic field (and thus induced signal) can be achieved in many scenarios.

Figure 6:
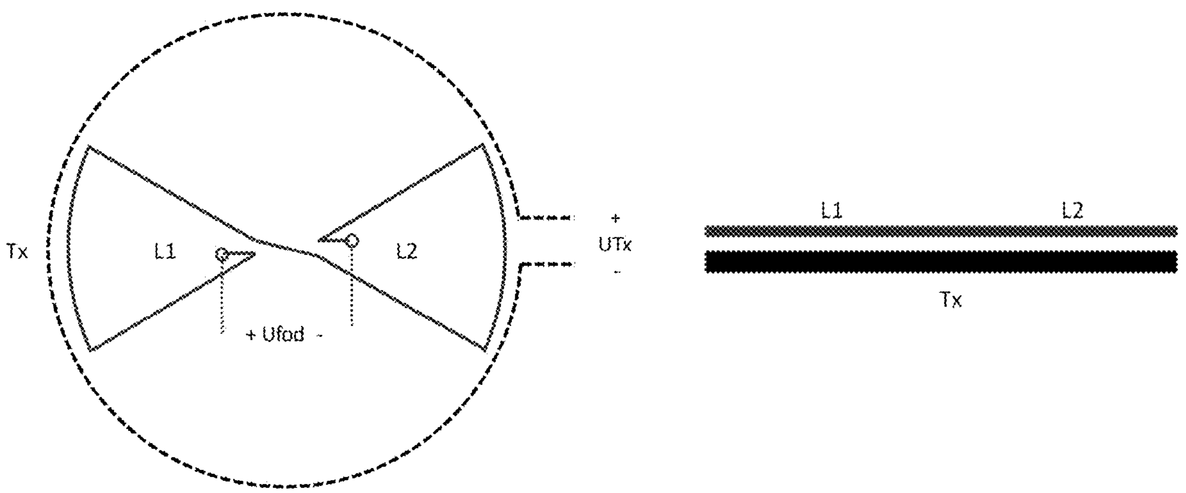
FIG. 6 illustrates an example of detection coils for a power transmitter in accordance with some embodiments of the invention.

An example of a detection coil arrangement is shown in FIG. 6. In the example the first detection coil 207 is formed as a first winding L1 and the second detection coil 209 is formed as a second winding L2 coupled in (anti) series such that the combined voltage of the two windings offset each other for a homogenous electromagnetic field. In the example, the detection coils 207, 209/windings L1, L2 are located opposite and symmetrically around a center point. They are further formed in a plane and the transmitter coil 103 is further formed in the same plane (or at least a substantially parallel plane). In the example, the detection coils are formed inside the transmitter coil. Further the detection coils are formed to have substantially the same outline and cover substantially the same area.

As a consequence, the electromagnetic flux through the two detection coils is substantially the same but in opposite directions with respect to the current directions in the detection coils. As a consequence, the induced voltage in the two detection coils 207, 209 is substantially the same but with the opposite phase/polarity and the combined voltage over the two series coupled detection coils 213 is cancelled to substantially zero.

The detection coils 207, 209 may be arranged such that in the presence of a homogenous field, and/or in the presence of an electromagnetic test field generated e.g. by the transmitter coil 103 with no other objects present, the induced signals/voltages at least partially cancels/compensates each other, ideally resulting in a zero combined voltage.

The arrangement of FIGS. 2 and 6 is such that an induced signal of a first of the two detection coils has an opposite voltage of an induced signal of a second of the two detection coils. The induced signals for the two detection coils have opposite phases for a homogenous field. The induced signals in the two detection coils have opposite phases. The two detection coils are coupled in series and in opposite phase such that the induced signals have opposite polarity. These properties exist for a homogeneous field and for the undistorted field generated by the transmitter coil 103. For a non-homogeneous field, the cancellation may only be partial.

Figure 7:
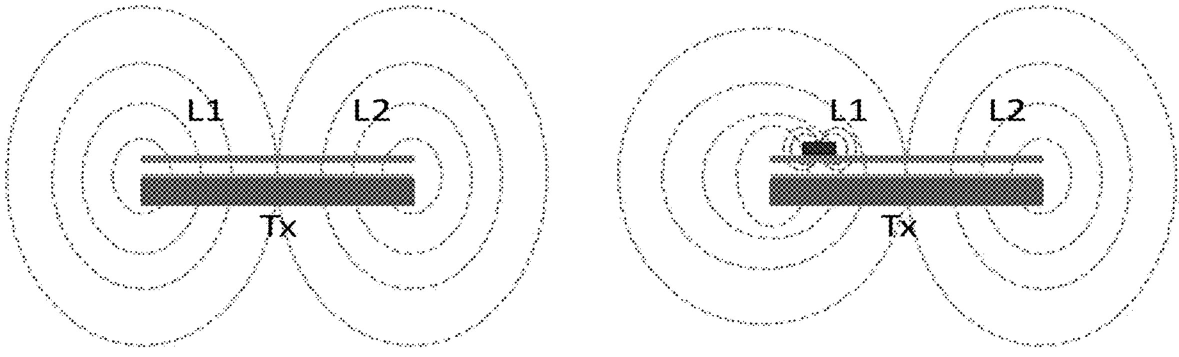
FIG. 7 illustrates an example of electromagnetic fields and detection coils for a power transmitter in accordance with some embodiments of the invention.

However, in the present of a metallic foreign object, the magnetic field will be distorted typically resulting in an asymmetry between the field for the two detection coils 207, 209. Typically, for a metallic foreign object, the generated electromagnetic test signal will induce eddy currents, which results in the foreign object generating an electromagnetic field such that the combined electromagnetic field is distorted relative to the field of the generated electromagnetic test signal. The resulting asymmetric field will result in different signals being induced in the first detection coil 207 and the second detection coil 209 as indicated by FIG. 7. Thus, in contrast to the situation where no foreign object is present and the flux through the two detection coils 207, 209 is symmetric resulting in a substantially zero combined voltage, the presence of the foreign object results in asymmetry and therefore a resulting voltage. This difference in the induced signal of the two detection coils 207, 209 can be used to detect the presence of the foreign object.

In the ideal theoretical case, the electromagnetic field generated by the transmitter coil 103 may be perfectly homogeneous and identical in the balanced detection coils 207, 209, and similarly the balanced detection coils 207, 209 are perfectly identical/symmetric. In such a case, the signals induced in the two balanced detection coils 207, 209 are exactly the same and will compensate each other perfectly resulting in the combined signal from the set of balanced detection coils being exactly zero in the absence of any foreign object or any other asymmetry in the environment.

However, it will be appreciated that in practice, such a scenario is highly unlikely. Typically even if the system is implemented to seek to provide as homogeneous a filed in the detection coils as possible, various asymmetries resulting from variations in the generated field, the electromagnetic environment, and/or the physical properties of the detection coils (or the transmitter coil 103) are likely to result in the signals generated in the individual detection coil varying somewhat and in the signals induced in the detection coils not perfectly compensating each other. In such cases, the combined output from a set of balanced detection coils may not be exactly zero. However, whereas this may possibly reduce the sensitivity of the foreign object detection and possibly even in some cases prevent small foreign objects from being detected accurately, the approach may still provide a substantially improved performance e.g. in comparison to using a single detection coil. A partial compensation between corresponding detection coils of a set of detection coils may provide a more accurate signal that can be used for foreign object detection. Indeed, typically any compensation between the detection coils will tend to provide an improved foreign object detection.

Thus, as long as the detection coils are arranged such that the signals induced in the two detection coils by the electromagnetic test field (generated by the transmitter coil 103) compensate each other, improved foreign object detection can be achieved.

Indeed, in some embodiments, even a strong non-homogenous electromagnetic test field may be used e.g. resulting in the compensation between the balanced detection coils being only partial and a relatively high combined (while still compensated) signal being generated. This may for example be due to asymmetric properties in the setup (for example differences in detection coils, asymmetry of the transmitter coil 103, asymmetry in the electromagnetic environment, e.g. caused by metallic elements or components of the system) that cannot be removed or which are needed for other purposes. In such a situation, the compensation may be removed but still provide improved performance.

Indeed, in some embodiments, a time varying field may even be generated, and possibly even with a non-homogenous field being generated. In such a scenario, the varying non-homogeneous field will result in a time varying combined signal which is only partially compensated. However, the combined signal resulting from the partial compensation will still be different depending on whether a foreign object is present or not and this may be used by the foreign object detector 205 to perform a foreign object detection.

For example, for the given time varying and non-homogeneous field generated by the transmitter coil 103, a combined (partially) compensated output signal in the absence of a foreign object may be determined. In some embodiments, such a determination may be made during manufacturing e.g. based on analysis or simulation. In other embodiments, it may e.g. be determined during a calibration process performed during initialization of the power transfer and e.g. in response to a user confirming that no foreign object is present. Subsequently, when a foreign object detection test is performed and the time varying and non-homogeneous test electromagnetic field is generated, the resulting combined signal from the balanced detection coils may be compared to the stored/expected result. If the difference exceeds a given amount (in relation to any suitable comparison and difference metric), it may be determined that a foreign object is present and otherwise it may be determined that it is not. For example, the measured combined signal may be correlated with the expected combined signal and if the correlation is below a threshold, a foreign object may be detected to be present.

For a non-varying time signal, a simple comparison of the combined signal (e.g. voltage) from the set of balanced detection coils (typically after some averaging or low pass filtering) to the expected signal level may be performed, and if the difference exceeds a threshold, a foreign object may be considered to be detected. In many embodiments, a foreign object may be considered to be detected either if the measured combined signal exceeds the expected level by a given amount or if the measured combined signal is below the expected level by a given amount.

In some embodiments, the decision criterion used for detecting a foreign object may thus be adapted based on the specific preferences and requirements and may e.g. be adapted to reflect variations in the generated electromagnetic field, the environment, the detection coils and/or the transmitter coil. Thus, the operation may be adapted to the specific conditions, requirements, and preferences of the individual embodiment.

In some embodiments, the power transmitter may comprise a calibrator which is arranged to calibrate the system for asymmetry in the induced signals. For example, as part of power transfer initialization, or e.g. regularly during power transfer, the system may perform a calibration. For example, the power transmitter may request a user input allowing the user to confirm that no foreign object is present. It may then proceed to measure the current combined signal level and it may generate a calibration value equal to the opposite value. A modified detection value may then be generated by adding the calibration value to the combined signal (i.e. subtracting the value measured during calibration from the value measured during foreign object detection tests) and the detection may be based on the modified value. For a time varying electromagnetic field, the calibration value may be time varying. In such an example, a simple static foreign object detection assessment based on the modified value may be used, such as e.g. a foreign object being detected if the absolute value of the modified signal exceeds a threshold.

Thus, although the approach may benefit from a homogeneous field being generated, and in many embodiments the system may seek to make the homogeneous field as homogeneous, and possibly constant, as possible, this is by no means an essential or necessary feature. Indeed, in many embodiments, desired performance may be achieved by intentionally creating a non-homogeneous field and/or a time varying field.

In the system of FIG. 2, the combined voltage of the pair of detection coils 207, 209 is measured directly and used to perform a foreign object detection. However, in other embodiments, the detection coils may e.g. be coupled in series with a measurement transformer such that the current through the detection coils 207, 209 also flow through the primary winding of the measurement transformer. Thus, the detection coils 207, 209 and the primary winding may be part of a series circuit through which current induced in the detection coils 207, 209 flows. The foreign object detector 205 may be coupled to the secondary of the measurement transformer and e.g. detect a foreign object if the secondary voltage of the measurement transformer exceeds a threshold.

It is noted that a primary winding of a transformer is a winding that draws power/energy from a source and a secondary winding is a winding that delivers the energy to a load, i.e. energy is transferred from the primary to the secondary winding.

The circuit may comprise other components and elements but in the specific example, the coupling between the detection coils 207, 209 is low ohmic. In most embodiments, the combined resistance of the coupling between the detection coils 207, 209 is less than 100 Ohm, and in many embodiments less than 50 Ohm, 10 Ohm, 5 Ohm, or even 1 Ohm in many embodiments. In many embodiments, the primary winding of a measurement transformer may be coupled directly to the detection coils 207, 209.

The measurement transformer may in such an example be implemented as a current transformer rather than a voltage transformer. Specifically, the measurement transformer may be arranged to have a winding ratio where the number of turns on the secondary winding is substantially higher than the number of turns on the primary winding. In many embodiments, the number of turns of the secondary winding is no less than 10, 20, 50, or 100 times higher than the number of turns on the primary winding.

The foreign object detector 205 is in the described system arranged to perform foreign object detection during the foreign object detection time interval based on a property of a signal from the balanced detection coils (possibly received via a measurement transformer). If the signal meets a suitable foreign object detection criterion, it is determined that a foreign object is present, and if not, it is determined that no foreign object is present. The specific foreign object detection criterion will depend on the specific preferences and requirements of the individual embodiment. In many embodiments, it may require that an amplitude of the signal from the balanced detection coils is above a threshold, for example it may require that an amplitude of the voltage and/or current of the output of the balanced detection coils. The output of the balanced detection coils may specifically be the voltage over the series coupling of the individual detection coils/windings.

In many power transfer systems, extensive communication is employed between the power receiver and the power transmitter in order to achieve efficient and reliable operation. In the system of FIG. 2, some or all of the communication between the power transmitter and the power receiver is performed using a dedicated communication system/approach. Thus, in the system, rather than modulating the power transfer signal, at least some of the communication is by use of separate communication carrier, and in the example the communication carrier is transmitted using a dedicated communication antenna.

In the described example, the power transmitter 101 comprises a communicator 211 which is coupled to the power transmitter controller 203 and to a communication antenna 213. The communicator 211 is thus arranged to transmit and/or receive data to/from the power receiver 105. The communicator 211 may communicate using a dedicated communication system/standard such as specifically an NFC communication system. The communicator 211 may be arranged to generate or receive a communication carrier and modulate/demodulate it as will be known to the skilled person.

A challenge for many wireless power transfer system is that of how to implement the different functionalities in the same devices without introducing negative cross-effects and interference. A particular challenge is the presence of different antennas and coils as the impact of an antenna on the electromagnetic field will affect all operations. In particular, the foreign object detection is often very sensitive and based on very delicate measurements. In particular, whereas the use of balanced detection coils may allow improved detection, it also makes the operation dependent on an accurate and effective balancing of the detection coils and the electromagnetic fields through these.

The issues are typically further exacerbated by the desire to implement the antennas in small and compact structure. In particular, it is for practical implementation reasons often preferable to implement foreign object detection coils and communication antennas close together, such as for example as different layers in the same printed circuit board.

Figure 8:
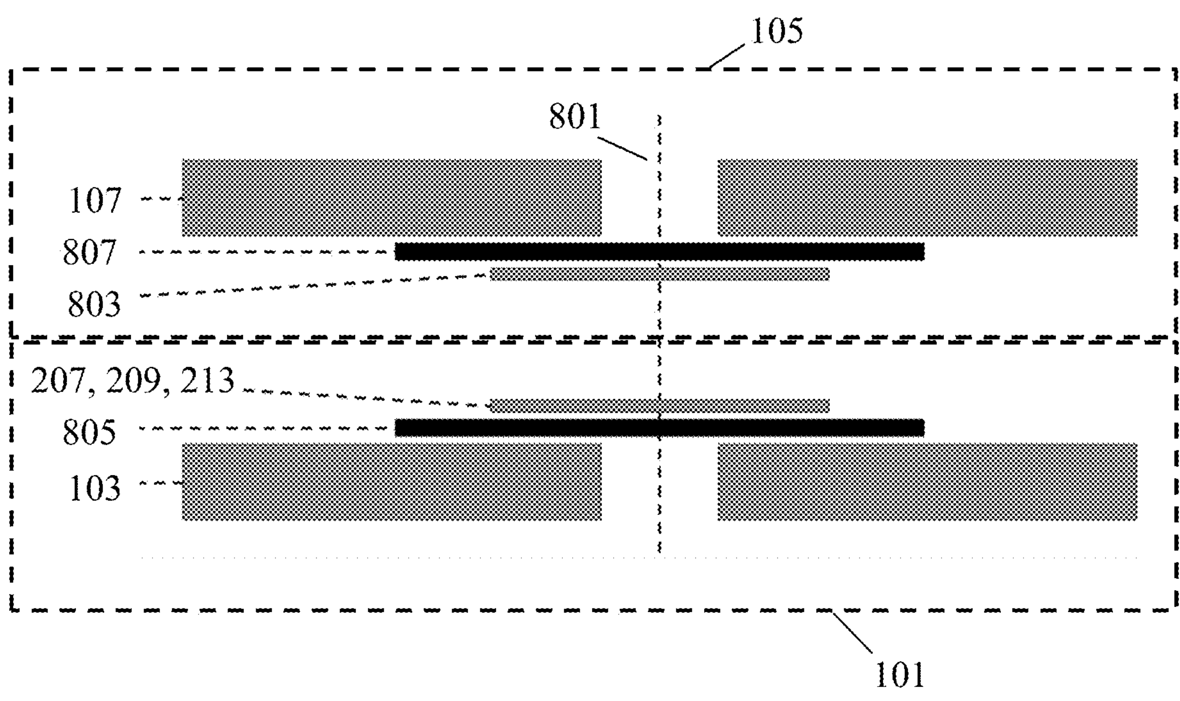
FIG. 8 illustrates an example of arrangements of coils in a power transfer system in accordance with some embodiments of the invention.

An example of a practical arrangement of antennas/coils for a power transmitter and power receiver are shown in FIG. 8. The figure shows a cross section with the transmitter coil 103 and the receiver coil 107 of respectively the power transmitter 101 and the power receiver 105 where the devices are positioned in a (n optimal) configuration for power transfer. In the example, the power receiver 105 is positioned on top of the power transmitter 101.

The power transmitter 101 comprises the transmitter power transfer coil 103 generating the power transfer signal. In the example of FIG. 8, the transmitter power transfer coil 103 is illustrated by two areas reflecting the cross section of the area comprising the windings and reflecting that a center area is free of windings.

In the example, the foreign object detection antenna, in the form of the balanced detections coils 207, 209, is positioned on top of the transmitter power transfer coil 103 towards the power receiver 105. The transmitter power transfer coil 103 and the foreign object detection antenna 207 are distributed around a center axis 801.

In the example, the communication antenna 213 is further distributed in substantially the same plane as the foreign object detection coils. For example, the foreign object detection coils 207, 209 and the communication antenna 213 may be disposed on different layers of the same printed circuit board (PCB).

Similarly, the power receiver 105 comprises the receiver power transfer coil 107 for receiving the power transfer signal. In the example of FIG. 8, the receiver power transfer coil 107 is illustrated by two areas reflecting the cross section of the area comprising the windings and reflecting that a center area is free of windings.

The receiver power transfer coil 107 is in the specific example coaxial and symmetrically distributed around the same center axis 801 as for the power transmitter 101 (reflecting optimal positioning of the power receiver 105 on the power transmitter 101).

The power receiver 105 further comprises a power receiver communication antenna 803 which is arranged to support communication between the power transmitter 101 and the power receiver 105 and which specifically couples to the communication antenna 213 of the power transmitter 101.

Although FIG. 8 illustrates an example where the power receiver is optimally placed with respect to the power transmitter such that the center axis 801 is common to both the coil arrangement for the power transmitter and for the power receiver, it will be appreciated that the power receiver will typically be placed with some misalignment and the center axis 801 will not completely line up for the power receiver to the power transmitter.

The arrangement of FIG. 8 may specifically be for cordless kitchen appliances with two large power transfer coils 103, 107 being used to transmit power from the transmitter to the receiver. The foreign object detection antenna 207 is placed between the power transfer coils 103, 107.

The arrangement may provide a very good coupling between the power transfer coils 103, 107 as well as good foreign object detection as the foreign object detection antenna 207 is positioned close to the area between the power receiver and the power transmitter. It may also provide efficient communication performance as the communication antennas can be positioned in close proximity and with a strong coupling.

A problem in such systems is that the antennas may interact/impact/interfere with each other. In the example, of FIG. 8 the power transfer coils 103, 107 may be electromagnetically shielded from the communication antennas 203, 803 and foreign object detection coils 207, 209 using magnetic shielding elements 805, 807 (which can be constructed such that the magnetic shielding is insignificant for the power transfer signal (e.g. due to differences in electromagnetic fields strength or frequency)). However, the close proximity of the detection coils 207, 209 with the communication antenna 213 results in potential interference between them, and in particular the closeness of the communication antenna 213 may affect the highly sensitive foreign object detection.

Specifically, during the foreign object detection time intervals, the transmitter coil 103 may generate a defined test signal (with known coil current and resulting magnetic field), which is picked up by the detection coils 207, 209. The detection coils can detect changes in the magnetic field of the transmitter coil 103 created by a foreign object. The positioning and design of the detection coils and the complete magnetic environment is very important because the system very sensitive.

In the approach of FIG. 8, the communication antenna 213 is positioned in (substantially) the same plane as the foreign object detection coils and accordingly they are in close proximity and are typically similar in size.

Although it has been proposed to improve foreign object detection by the use of balanced detection coils such as those of FIG. 6, the Inventor has realized that a substantial problem even for such approaches is that the presence of a communication antenna in relative proximity tends to degrade performance and make it more difficult to detect foreign objects. This problem is exacerbated in many practical implementations as it is often desirable to be able to position the communication antenna and the foreign object detection coils very close to each other. The Inventor has further realized that the impact can be reduced by configuring the communication antenna such that the presence of the communication antenna is at least partially balanced across the different balanced detection coils.

Improved performance may often be achieved by the use of a communication antenna that comprises two communication coils coupled in parallel where the two coils are arranged such that they couple to two different detection coils such that the coupling from one communication coil to one detection coil is at least partially compensated in the output from the balanced detection coils by the coupling from the other communication coil to the other detection coil. Specifically, the communication antenna is arranged with a first segment of a first communication coil having a first coupling to a first detection coil and a second segment of a second communication coil having a second coupling to a second detection coil of the balanced detection coils. Further, the arrangement is such that the first and second couplings compensate each other in the output signal.

The couplings may be inductive and/or capacitive couplings.

In some embodiments, the impact of the capacitive coupling between the first detection coil and the first segment of the first communication coil will in the output signal from the balanced detection coils be compensated/reduced by the impact of the capacitive coupling between the second detection coil and the second segment of the second communication coil.

In some embodiments, the impact of the inductive coupling between the first detection coil and the first segment of the first communication coil will in the output signal from the balanced detection coils be compensated/reduced by impact of the inductive coupling between the second detection coil and the second segment of the second communication coil will in the output signal.

In many embodiments, the couplings may be both inductive and capacitive couplings.

In some embodiments, the impact of the inductive and capacitive coupling between the first detection coil and the first segment of the first communication coil will in the output signal from the balanced detection coils be compensated/reduced/at least partially cancelled by the impact of the inductive and capacitive coupling between the second detection coil and the second segment of the second communication coil.

The compensation of a first coupling by a second coupling may be such that a signal component in the output signal (from the set of balanced coils) resulting from the first coupling is reduced by the signal component in the output signal resulting from the second coupling. The signal components introduced in the first detection coil by the first coupling may thus be reduced by the signal component introduced in the second detection coil by the second coupling. With the two detection coils being coupled in series, as e.g. in the example of FIG. 6, the voltage or current contributions/distortions/signal components arising from the couplings may be opposite in phase and may add up to a combined value/sum amplitude that is lower than the maximum amplitude of the individual contributions/distortions/signal components. Indeed, in many embodiments and scenarios, it may be feasible for the contributions to completely cancel each other out.

The approach may thus use two parallel coupled communication coils to couple symmetrically to two detection coils such that the coupling effects/signal components from the different couplings (partially or fully) compensate each other in the combined output signal.

In many embodiments, the spatial arrangement of the first communication coil relative to the spatial arrangement of the first detection coil corresponds to/is symmetric to the spatial arrangement of the second communication coil relative to the spatial arrangement of the second detection coil.

In many embodiments, the spatial arrangement of the first communication coil may be the same as the spatial arrangement of the second communication coil. For example, the first communication coil can be transformed into the second communication using only translation, rotation, and mirroring transforms. Similarly, the spatial arrangement of the first detection coil is the same as the spatial arrangement of the second detection coil. For example, the first detection coil can be transformed into the second detection using only translation, rotation, and mirroring transforms. Further, the position/orientation of the first communication coil relative to the first detection coil corresponds to the position/orientation of the first communication coil relative to the second detection coil.

In many embodiments, the spatial relationship between the first communication coil and the first detection coil thus corresponds to a spatial relationship between the second communication coil and the second detection coil. The spatial relationships may be identical, and in many embodiments, the spatial relationships may be such that a combined spatial configuration of the first detection coil and the first communication coil can be transformed into a combined spatial configuration of the second detection coil and the second communication coil by a (geometric/spatial) transformation including only translation, rotation, and mirror transforms.

In many embodiments, the inductive coupling between the first communication coil and the first detection coil is (at least partially) balanced with the inductive coupling between the second communication coil and the second detection coil.

In many embodiments, the communication antenna is arranged such that a first signal component induced in the first detection coil from a current in the first communication coil is compensated in the output signal by a second signal component induced in the second detection coil from a current in the second communication coil.

The arrangements of the two pairs of a detection coil and a communication coil may thus be such that the relative current directions result in a reduction of the combined induced signal in the two detection coils, and the induced currents may be out of phase with each other and may specifically have opposite phases. This may be achieved by the current direction in the first communication coil relative to the current direction in the first detection coil being opposite the current direction in the second communication coil relative to the current direction in the second detection coil. The current direction need not reflect an actual current but reflect a nominal direction of a wire such that current flowing in that direction is considered a positive current and current flowing in the opposite direction is considered a negative current.

In many embodiments, the relative spatial arrangements may be substantially the same but with the current directions being in opposite directions.

In many embodiments, the capacitive coupling between the first communication coil and the first detection coil is (at least partially) balanced with the capacitive coupling between the second communication coil and the second detection coil. In addition to the spatial arrangement, the communication antenna 213 may be arranged such that the voltage potential and voltage distribution over the communication coils are corresponding and symmetric with respect to the detection coils.

In some embodiments, the voltage potential for a segment of the first communication coil matches, and is substantially the same as, a voltage potential for a second segment of the second communication coil where the two segments have the same spatial relationship with respect to respectively the first detection coil and the second detection coil.

In many embodiments, a voltage distribution in the first communication coil relative to the first detection coil is symmetric with a voltage distribution in the second communication coil relative to the second detection coil. In such a scenario, the capacitive coupling between the first detection coil and communication coil pair will be substantially the same as the capacitive coupling between the second detection coil and communication coil pair if the spatial relationships are substantially the same.

In many embodiments, the first and second communication coils are substantially identical and are coupled directly in parallel thereby resulting in substantially the same voltage distribution over the communication coils. Segments of the two communication coils that are at the same distance (along the coil wire) from the common connection point may thus have the same voltage potential (or potential distribution/average voltage potential for extended segments)

Further with the first and second detection coils being substantially identical and the communication coils being positioned identically/symmetrically with respect to the respective detection coils, the detection coils may experience the same effective capacitive coupling to the parallel coupled communication coils thereby resulting in the resulting impact and signal components from the capacitive couplings substantially cancelling in the combined output from the balanced detection coils.

It will be appreciated that whereas a complete cancelling of the effects of the couplings is preferable in most scenarios, a partial cancelling/compensation/reduction of the effects will also typically be beneficial.

In many embodiments, the communication antenna, and specifically the communication coils, may be arranged such that both the inductive and capacitive couplings are mitigated and compensated. In particular, in many embodiments, the communication coils may be arranged to include more, some, or even all the above described considerations relating to spatial arrangements, currents in the coils, and voltage distributions in the coils.

In some embodiments, the spatial constraints and properties described above may extend to the communication coils as a whole, i.e. to the entire length/extent of the communication coil. In other embodiments, the relationship may be restricted to only one or more segments of the communication coils, such as for example only to the segments of the communication coils which overlap the corresponding detection coils. For example, the described relationships between the first communication coil and the first detection coil may apply (specifically/only) to a segment of the first communication coil which overlaps the first detection coil (e.g. in a perpendicular direction to the plane of the first detection coil). Similarly, the described relationships between the second communication coil and the second detection coil may apply (specifically/only) to a segment of the second communication coil which overlaps the second detection coil (e.g. in a direction perpendicular to the plane of the second detection coil).

The approach may thus use balanced detection coils together with a communication antenna that includes multiple parallel communication coils to reduce the impact and effect of couplings between the foreign object detection coils and the communication antenna. The approach may allow a substantially improved foreign object detection in many embodiments, and may provide improved implementation. For example, it may typically reduce the constraints on physical position of the coils, and may e.g. allow the foreign object detection coil and communication antenna to be positioned in very close proximity.

It is noted that the coupling and resulting interference is typically caused simply by the presence of the communication antenna being physically close to the foreign object detection coils and that it therefore cannot be removed by operating foreign object detection and communication in different time intervals, i.e. by using a time division approach. However, the described approach may mitigate the coupling even if no time division is employed.

In the described example, the foreign object detection antenna uses two (or more) balanced detection coils and these are capacitively/inductively coupled to the communication antenna. For a conventional communication antenna using a single coil, inductive coupling may introduce asymmetry. Further, even if inductive asymmetry was reduced or even completely removed, the changing voltage distribution over the communication antenna would mean that the balanced detection coils will capacitively couple to segments of the antenna with different voltages, thus resulting in an asymmetric capacitive coupling. Typically, the foreign object detection coils are carefully designed to achieve very accurate and sensitive detection and therefore it is subject to significant design constraints. However, by using multiple parallel coupled communication coils, these can be designed to exhibit not only symmetric inductive coupling but also to provide a more symmetric voltage distribution relative to the detection coils, and thus a more symmetric capacitive coupling. This may allow a much improved foreign object detection in many embodiments.

In many embodiments, the foreign object detection coils and the communication antenna/coils may be planar antennae/coils.

In particular, the set of balanced detection coils is typically formed in a first plane and the communication coils are planer coils formed in a second plane where the first plane and the second plane are substantially parallel. In most embodiments, the angle between planes may be no more than 10°, 5°, 3° or 1°.

In many embodiments, the antennae/coils can be implemented as layers on a Printed Circuit Board (PCB) and indeed many embodiments, the foreign object detection coils and the communication antenna can be implemented in different layers of the same PCB.

FIG. 6 illustrates an example of a set of balanced detection coils implemented as planar coils in a single plane. The coils may be implemented in a layer of a PCB.

Figure 9:
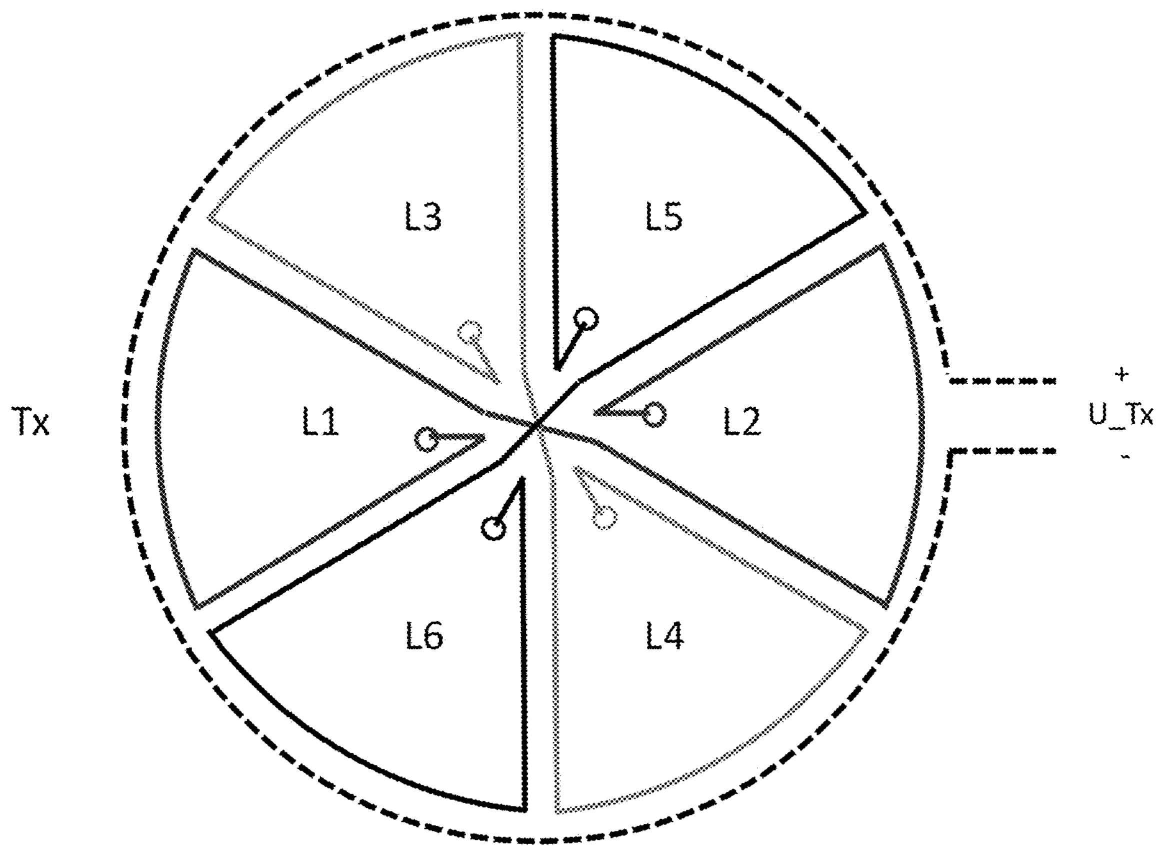
FIG. 9 illustrates an example of detection coils for a power transmitter in accordance with some embodiments of the invention.

In other embodiments, a plurality of sets of balanced detection coils may be used, and the foreign object detection may be arranged to perform foreign object detection based on the output signals from one or more of these sets of balanced detection coils. FIG. 9 illustrates an example of a planar arrangement of three sets of balanced detection coils where each set of balanced detection coils comprise two detection coils that are arranged opposite of each other.

In the example of FIG. 9, the power transmitter may be generated to include three sets of balanced detection coils with each set consisting of two detection coils. In this example, the foreign object detection may measure the output signal from each of the three balanced detection coil pairs and use these to perform a foreign object detection. The exact criterion used will depend on the preferences and requirements of the individual embodiment. As a low complexity example, a foreign object detection may be determined to be detected if at least one of the sets of balanced detection coils generates a signal exceeding a given threshold. In some embodiments, the different signals may be evaluated and compared e.g. to generate a position estimate for a detection foreign object.

Each of the spatial detection coils span or encompass an area of the plane in which the coils are formed. In the example, each detection coil has a substantially circular sector outline and thus spans a circular sector area. It will be appreciated that the outline and shape may be different in other embodiments. For example, the outer sector may be linear rather than curved/circular (e.g. the shapes may be triangular). As another example, in some embodiments, the outline of the detection coils may be substantially rectangular.

In the example, the detection coils of a set of balanced detection coils are rotationally symmetric around a rotation point. Indeed, in the example the detection coils of different sets of balanced detection coils are rotationally symmetric. In many embodiments, such as those of FIGS. 6 and 9, a detection coil thus spans an angular interval with different detection coils 207, 209 spanning different and non-overlapping angular intervals from the rotation point. In the example, the detection coils are furthermore mirror symmetric around a center radial extending from the rotation point at an angle being the midpoint of the angular interval covered by the detection coil.

In the specific example, there is thus a high degree of symmetry between the detection coils for a set of balanced detection coils and indeed between detection coils from different sets of balanced detection coils.

The two communication coils coupled in parallel may be designed to have corresponding symmetries with respect to the detection coils such that the impact of coupling between one of the communication coils and one of the detection coils is at least partly compensated by a corresponding coupling between the other communication coil and the other detection coil of the balanced detection coils.

In many embodiments, the communication coils may be arranged to have the symmetries as the detection coils. Specifically, the first communication coil and first detection coil arrangement can be transformed to match the second communication coil and the second detection coil. In the example, the communication coils may be rotationally symmetric around the same rotation point around which the detection coils are rotationally symmetric. The rotation for which symmetry occurs may also be the same, i.e. if a rotation by an angle of X can transform the first detection coil into the second detection coil then a rotation by the same angle X will also transform the first communication coil into the second communication coil. In some embodiments, the transforms may specifically be limited to include only rotation, translation, and mirror transforms or symmetries.

In embodiments where the communication antenna and foreign object detection coils are formed in two parallel planes which may be very close to each other, the symmetries may often be considered as two dimensional symmetries. The coils may specifically overlap each other.

The spatial considerations of the arrangements may be considered by considering the projection of the communication coils onto the (plane of the) foreign object detection coils, and specifically with the projection being a perpendicular or orthogonal projection in a direction which is perpendicular to the planes in which the foreign object detection coils and/or the communication coils are formed. It is noted that in practice the distance between the planes is typically very small compared to the size of the coils and antenna, and the projection tends to be trivial and indeed the coils can essentially be considered to be formed in the same plane.

The detection coils span (encompass/outline/surround) an area in the plane in which the detection coils are formed. In many cases, the communication coils will be such that the communication coils overlap these areas and thus the perpendicular projection falls within the spanned areas. The coupling considerations previously described may specifically apply between segments of the communication coils within a given spanned area and the detection coil that spans that area. In many areas, the communication coils may be arranged such that the projected segment of the first communication coil within an area spanned by a first detection coil of a set of balanced detection coils is the same as the projected segment of the second communication coil within an area spanned by a second detection coil of the set of balanced detection coils. This will typically for planar coil arrangements lead to matching coupling effects that will cancel out in the combined signal from the set of balanced detection coils.

Thus, in many embodiments, the first detection coil spans a first area in a first plane and the second detection coil spans a second area in the same plane with the communication coils being arranged such that an orthogonal/perpendicular projection of the segment of a first communication coil on the first plane has a same spatial relationship relative to the first area as a spatial relationship of an orthogonal/perpendicular projection of a segment of a second communication coil on the first plane relative to the second area. Specifically, an orthogonal/perpendicular projection of the first communication coil onto the first area may match an orthogonal/perpendicular projection of the second communication coil onto the second area.

In the following, an example of a specific implementation of a pair of communication coils that meets most, or all, of the considerations set out above will be described. The example will be described with reference to FIGS. 10 to 15. The specific design has the advantage that it can be implemented in very few layers, and specifically in many embodiments can be implemented in only two layers, such as different layers of a printed circuit board.

Figure 10:
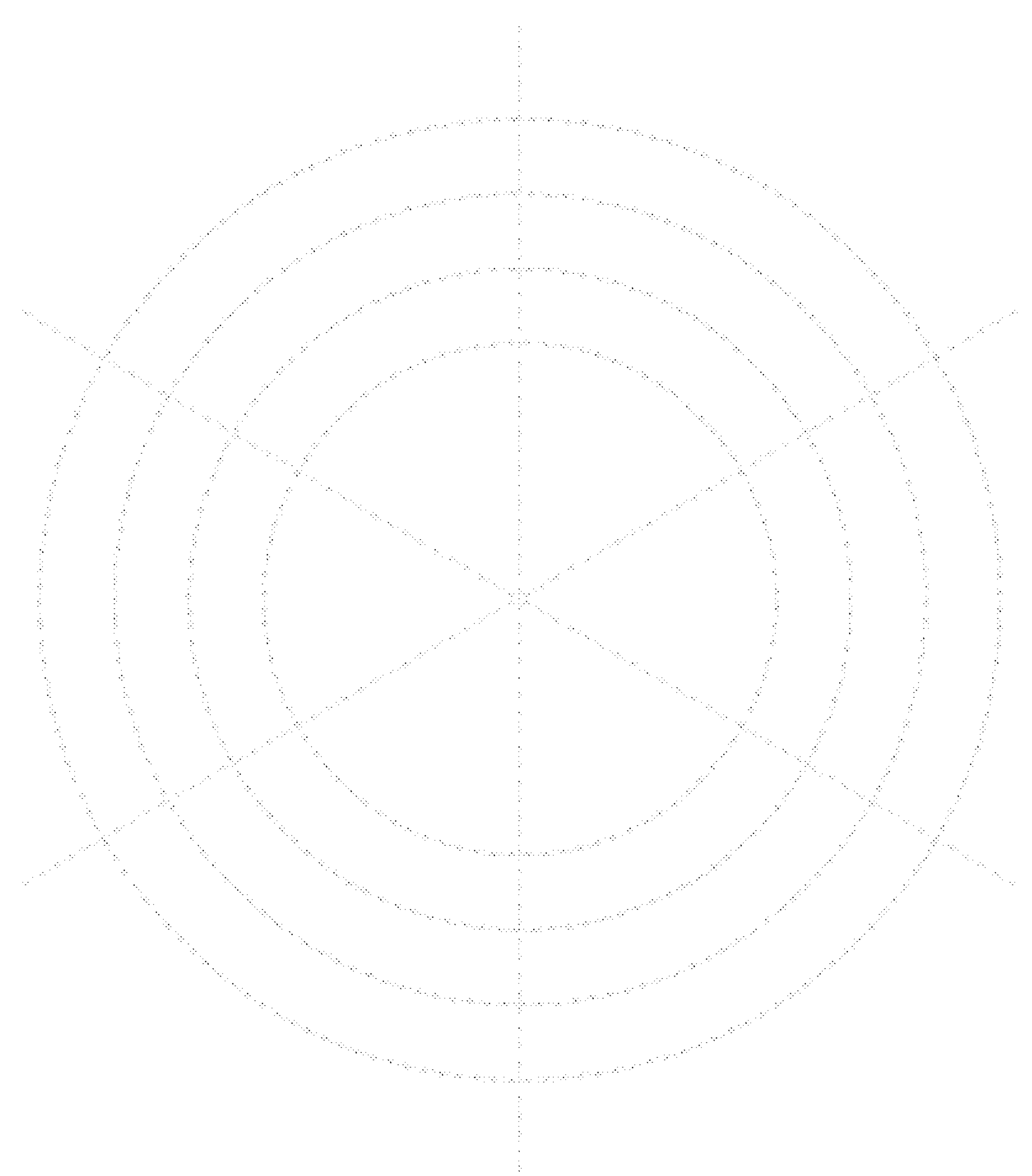
FIGS. 10-15 illustrate examples of segment designs for communication coils in accordance with some embodiments of the invention.

The design is based on distributing segments of the communication coils along concentric curves that surround the rotation point. FIG. 10 illustrates a set of concentric circles that may be used as an underlying template or grid for the configuration of the communication coils. Although the example illustrates a set of equidistant concentric circles, it will be appreciated that other closed curves and other distances between these may be used in other embodiments. In many designs, however, the closed curves may be rotationally symmetric around the rotation points for rotations by an angle corresponding to the angle between two detection coils. In many embodiments, the closed curves may have the same rotational symmetry as the detection coils. Thus, for an angle of rotation resulting in the same detection coil configuration, the rotation of the closed curves will also result in the same configuration.

The design of communication coils suitable for the detection coils of FIG. 9 will be described and FIG. 10 illustrates the outlines of the angular sections for each of the six detection coils by radial lines from the center rotation point.

Figure 11:
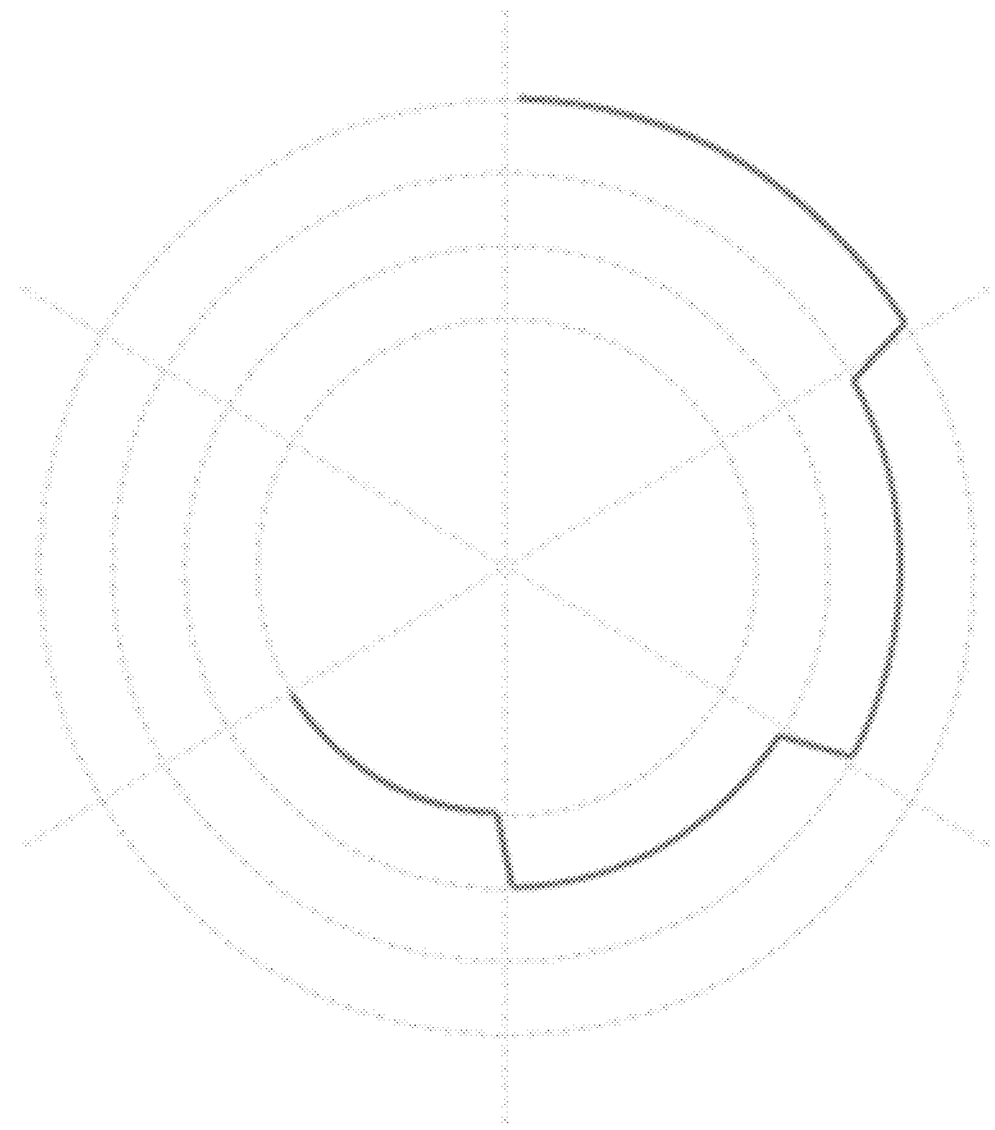

The formation of the first communication coil can be illustrated by considering a sequence of steps. First, a set of segments may be distributed along the curves as shown in FIG. 11. In the example, the communication coil follows one of the closed curves within each angular interval corresponding to a detection coil. Thus, in the example, the first communication coil comprises segments corresponding to the angular intervals with each segment following one of the concentric curves. For concentric circles, each segment is a segment of a circle.

Furthermore, in the example, segments in adjacent angular intervals follow different concentric curves and thus when transitioning from one angular interval to another (and thus from one detection coil to another), the coil also transitions from one concentric curve to another. The transitioning from one concentric curve to another is in many examples formed by segments that are radial to the rotation points. In the example, the first segment distributed along the outside closed curve is connected to a second segment distributed along the adjacent closed curve via a transition segment that is radial to the rotation point and which follows the border between two detection coils. Similarly, the second segment is connected to a third segment along the next inner closed curve via another radial interconnecting transition segment.

Figure 12:
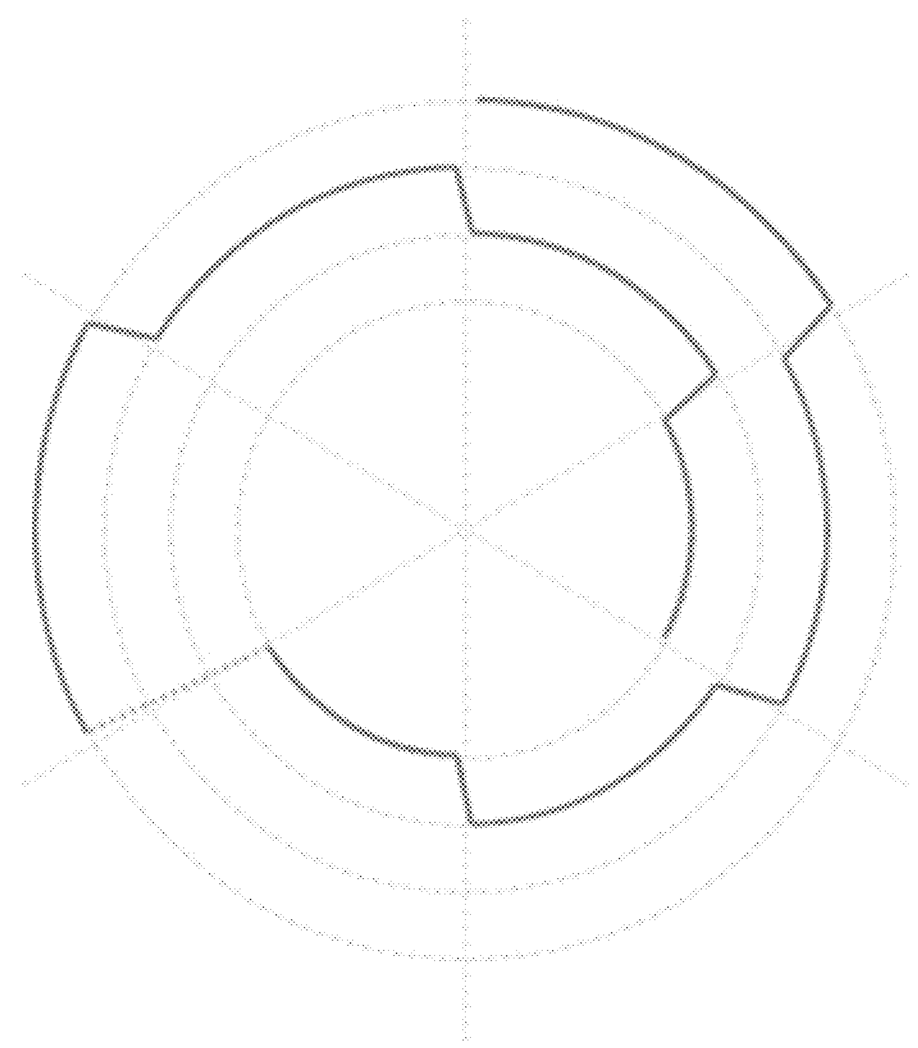
Figure 13:
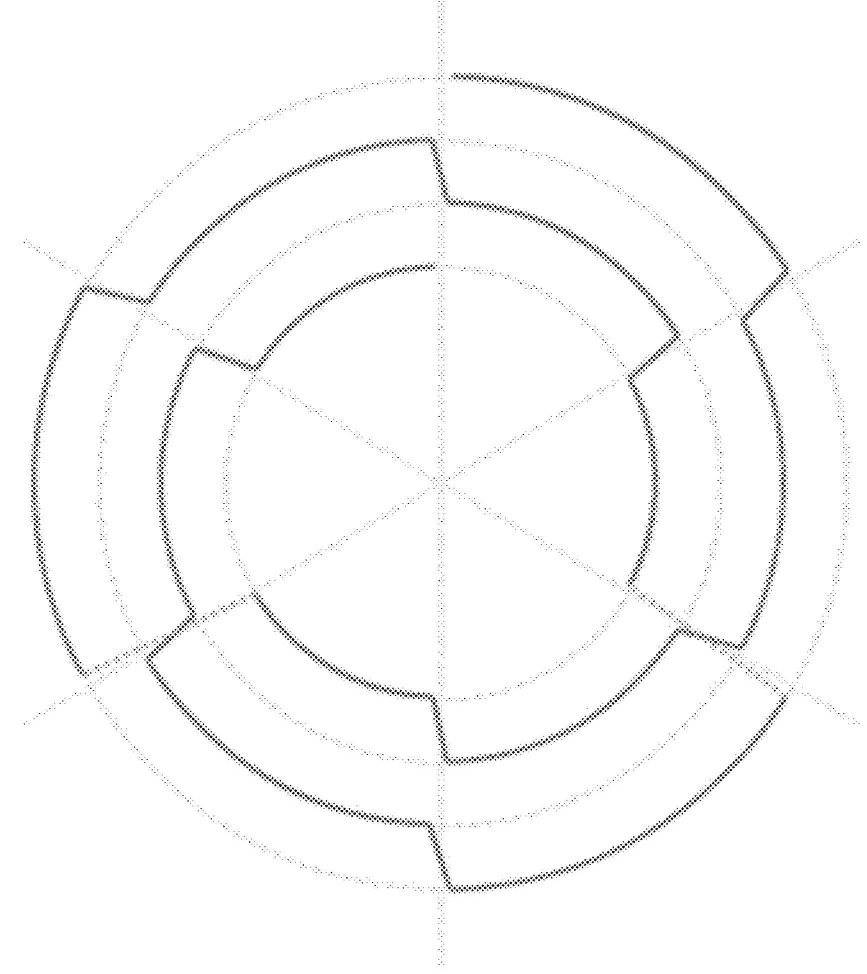
Figure 14:
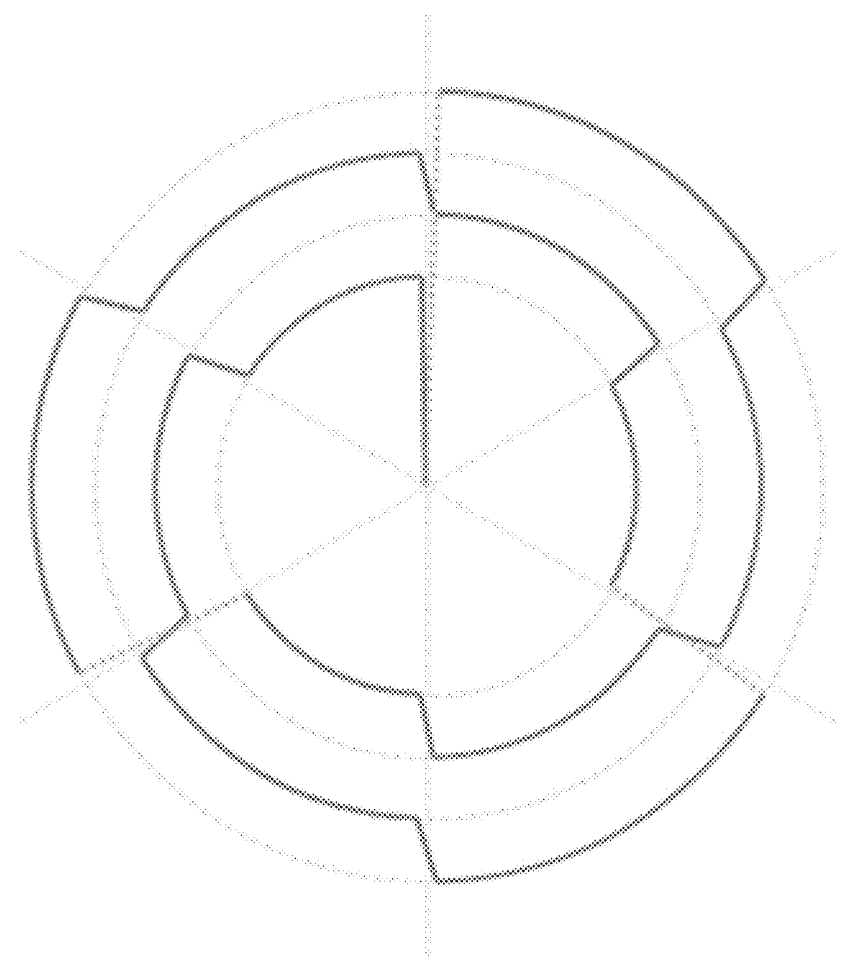

FIG. 11 shows four part circular segments corresponding to four detection coil areas distributed along four concentric circles. The arrangement may then, as shown in FIG. 12, be repeated with a rotation corresponding to the four detection coils. The end of the inner segment (the last segment of the first repetition) may be coupled to the outer segment of the second repetition (the first segment of the second repetition). This process may then be repeated to create a third repetition of the pattern of segments resulting in the coil arrangement shown in FIG. 13. This results in a coil consisting of an irregular diameter with two turns and as shown in FIG. 14, the end points of the coil may be fed to the center of the coil via radial connections to provide central connection points for the coil.

The second communication coil may be generated with a pattern/shape/spatial configuration that is identical to the first coil, but with a rotation of 180° around the rotation point. Thus, the first and second communication coils are rotationally symmetric around the rotation point. Further, as a result of this rotation, the parts of the concentric closed curves that were not occupied by the first communication coil are occupied by the second communication coil and no part of the curve is occupied by both communication coils, i.e. there is no overlap between these.

Figure 15:
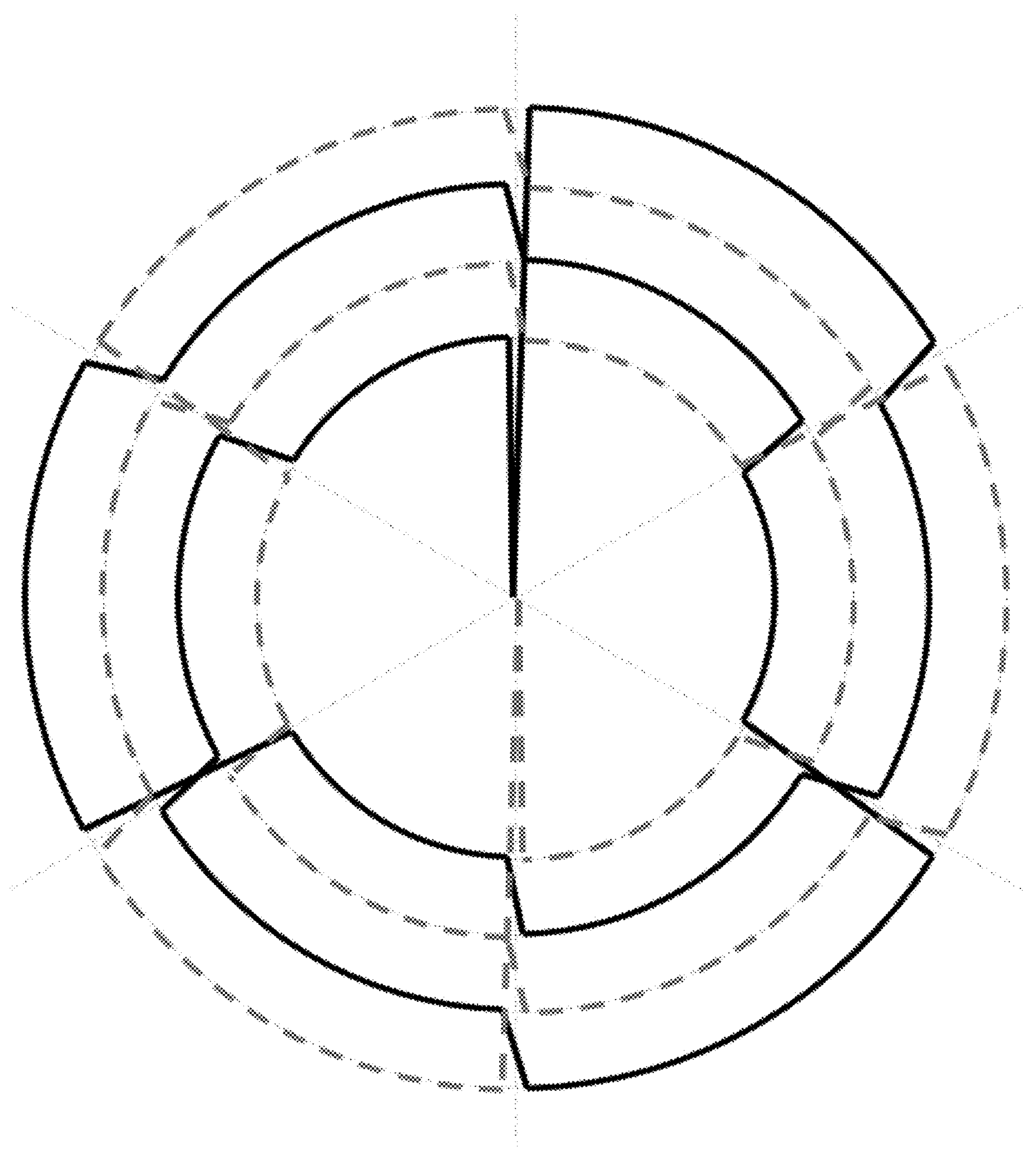

FIG. 15 illustrates the resulting communication antenna 213 which is formed by the two communication coils that are coupled in parallel (the second communication coil is shown by a dashed line).

As can be seen, the approach results in each angular interval comprising a plurality of segments distributed along different closed curves for each of the first communication coil and the second communication coil. The segments are connected via substantially radial connections.

Further, the coils are rotationally symmetric with respect to the detection coils such that for two detection coils of a set of balanced detection coils, the detection coils are rotationally symmetric and indeed so are the spatial relationships with respect to the communication coils if these are switched. Thus, the spatial configuration of the first communication coil relative to the first detection coil (and specifically within the angular interval of the first detection coil) is the same as the spatial configuration of the second communication coil relative to the second detection coil (and specifically within the angular interval of the second detection coil). Similarly and additionally, the spatial configuration of the second communication coil relative to the first detection coil (and specifically within the angular interval of the first detection coil) is the same as the spatial configuration of the first communication coil relative to the second detection coil (and specifically within the angular interval of the second detection coil).

Thus, full symmetry is achieved between respectively the first and the second communication coils and the first and second detection coils. Further, the communication coils are coupled in parallel and apart from possible practical deviations affecting the balance, the exact same current and voltage distribution will exist for the first and second communication coils. As a result, the effect of the coupling between the first communication coil and the first detection coil will be the same as the effect of the coupling between the second communication coil and the second detection coil. Similarly, the effect of the coupling between the first communication coil and the second detection coil will be the same as the effect of the coupling between the second communication coil and the first detection coil. As the currents in the two communication coils is the same, and as the detection coils have different current directions relative to the current directions in the communication coils (they are swapped over in the center as shown in FIGS. 6 and 9), the emf induced in the detection coils by the currents in the detection coils will cancel each other. Similarly, as not only the spatial configurations but also the voltage potentials along the segments are identical for the two detection coils, the capacitive coupling will be the same and the effects of the capacitive couplings will cancel out. As a result, substantially more accurate foreign object detection may be performed.

Another substantial advantage is that the approach allows for a very efficient implementation of antennas of a wireless power transfer system. The communication antenna can be positioned very close to the foreign object detection coils and can in many embodiments be implemented on different layers of a single PCB. Indeed, the described arrangement allows for both foreign object detection coils and communication coils to be implemented by a single two-layer PCB. Thus, a very compact and practical implementation can be implemented. This may further allow the coils to be positioned between the transmitter coil and the receiver coil, such as e.g. in the example of FIG. 8, while still allowing very good coupling to be achieved for power transfer.

Figure 16:
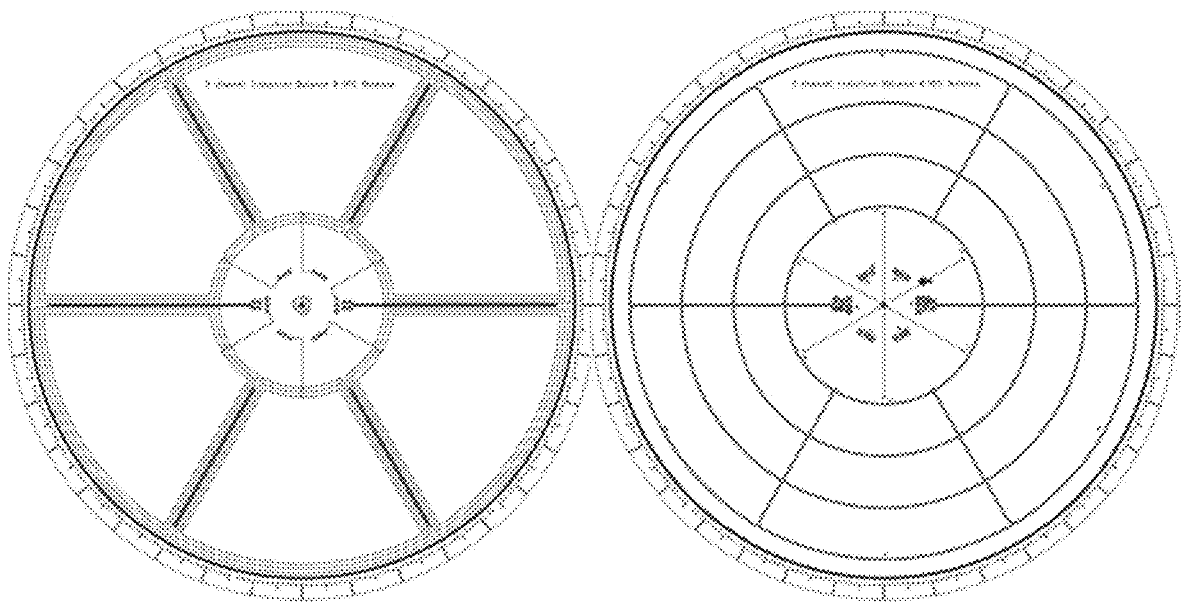
FIG. 16 illustrates an example of practical implementations of a communication and detection antennas in accordance with some embodiments of the invention.
Figure 17:
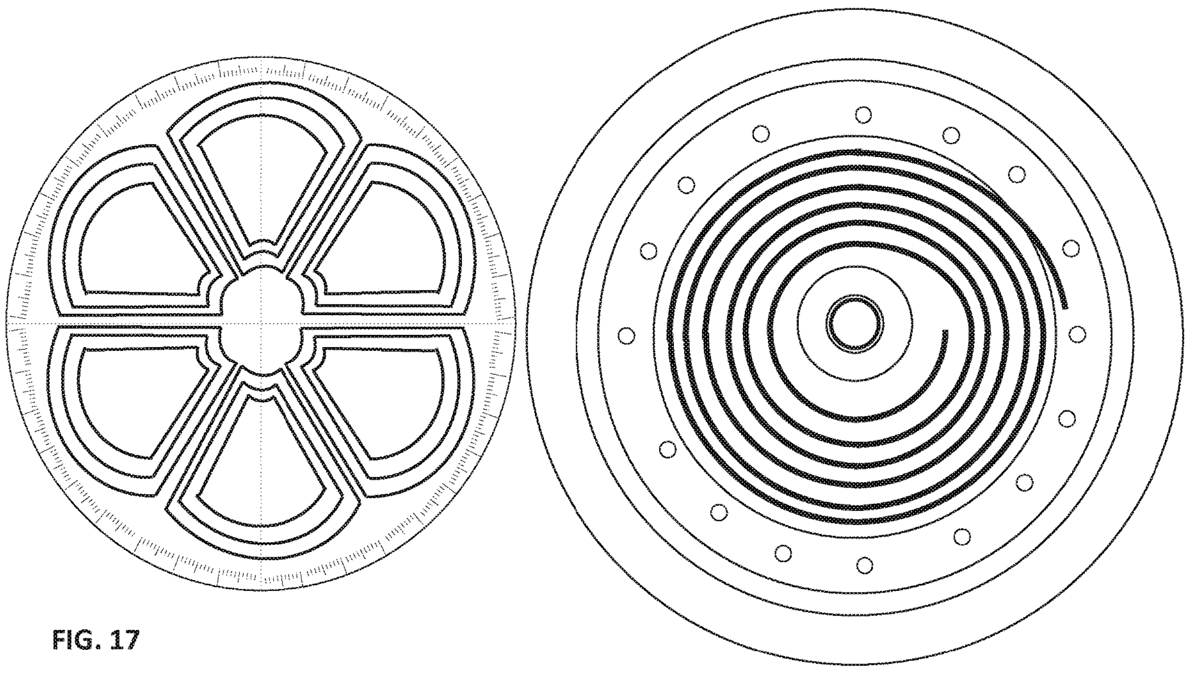
FIG. 17 illustrates an example of practical implementations of a communication and detection antenna in accordance with some embodiments of the invention next to a power transmitter coil.

FIG. 16 illustrates a practical design of foreign object detection coils and communication coils for different layers of a single PCB and FIG. 17 illustrates a photo of an implementation of such a PCB next to a high power transmitter coil.

Figure 18:
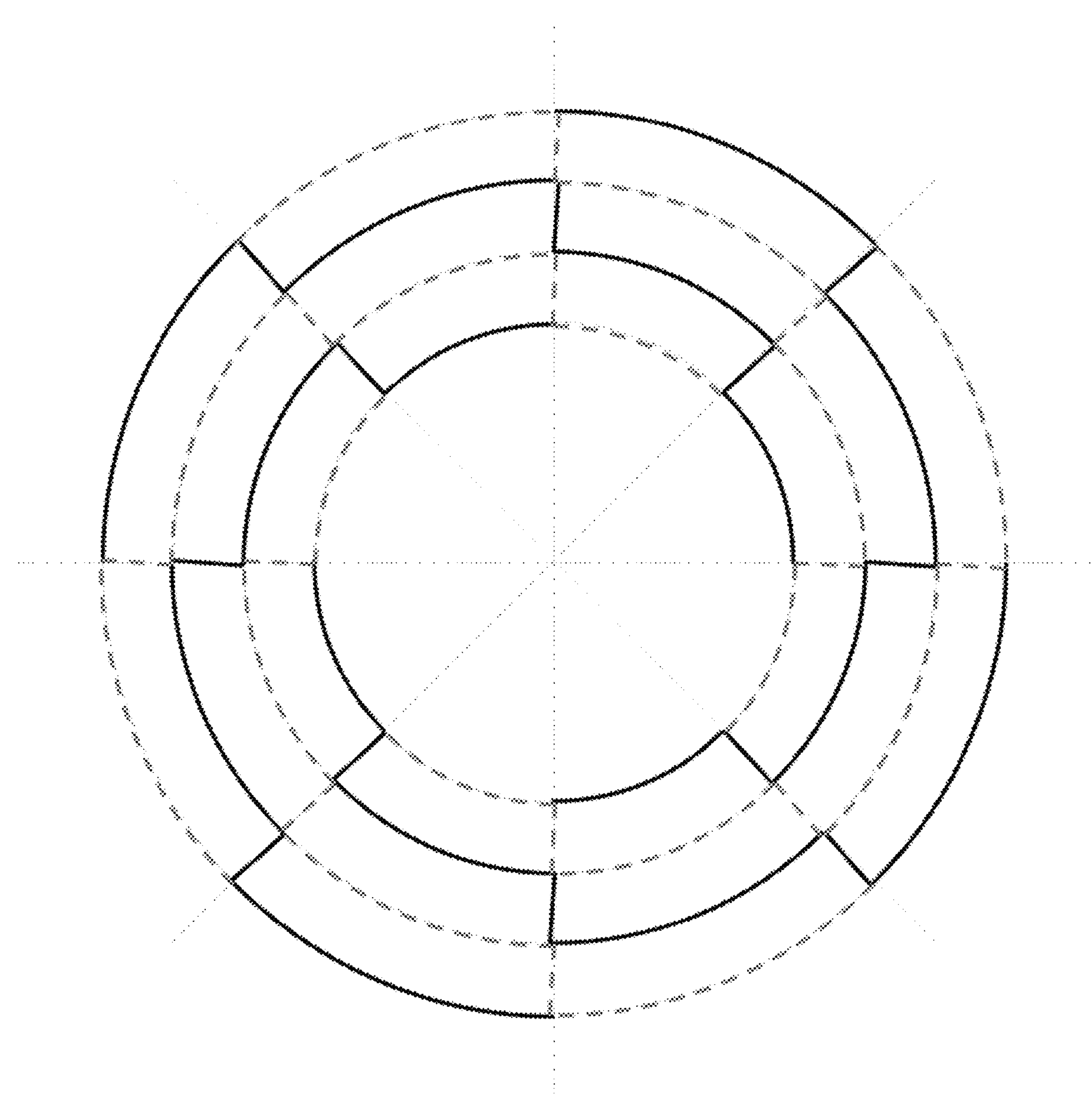
FIGS. 18-19 illustrate examples of segment designs for communication coils in accordance with some embodiments of the invention.
Figure 19:
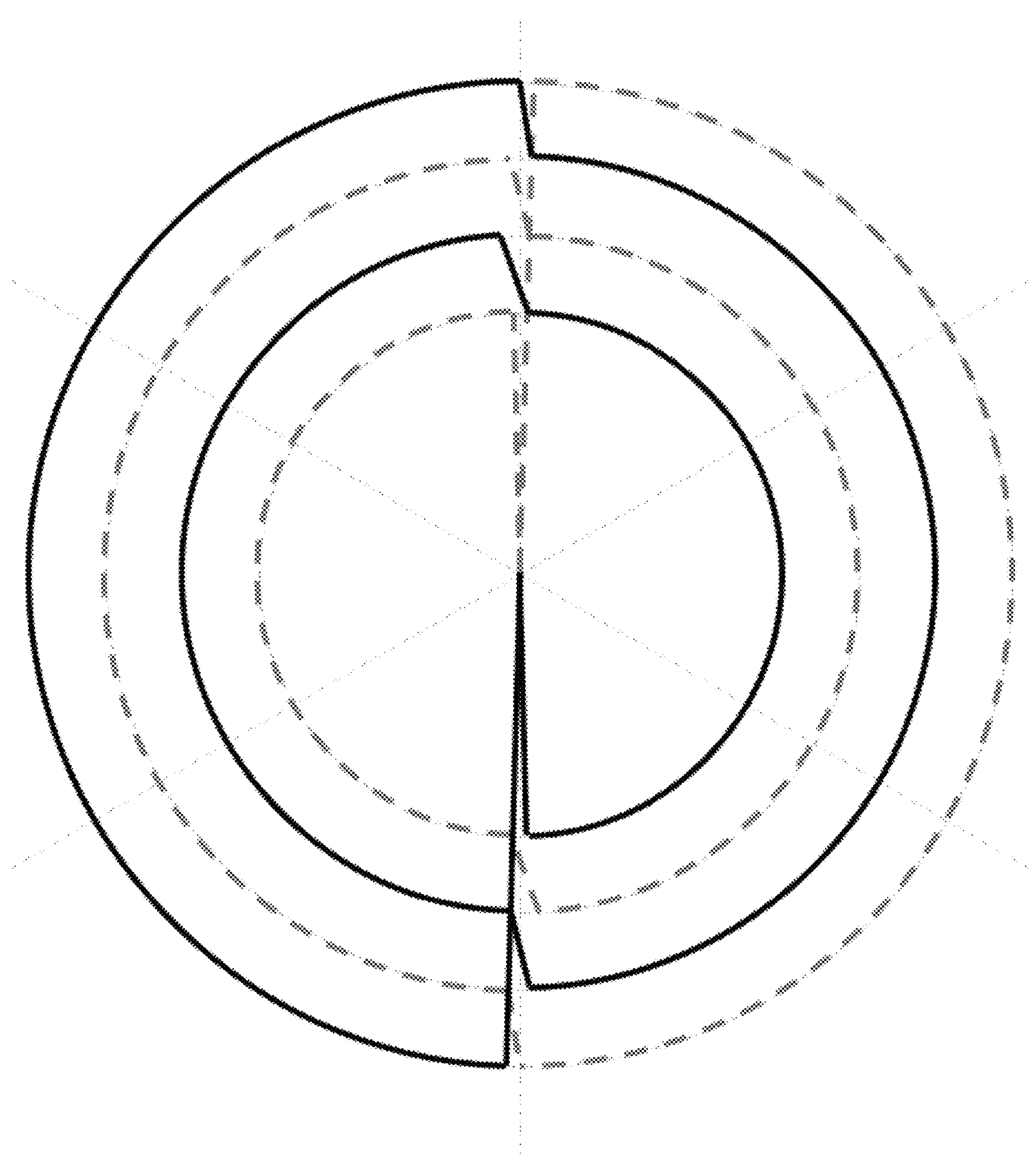

It will be appreciated that the approaches described above may lead to a number of other possible implementations and layouts of in particular the communication coils. For example, FIG. 18 illustrates and example corresponding to FIG. 15 but suitable for a system implementing eight foreign object detection coils and FIG. 19 illustrates an example of another possible layout for communication coils that could possibly be used both for six and eight foreign object detection coils.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. The inclusion of a feature in a dependent claim of one independent claim does not imply a limitation to this independent claim but rather indicates that the feature is equally applicable to other independent claims as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. A power transmitter comprising:

a transmitter coil, wherein the transmitter coil is arranged to generate an electromagnetic test field;

two detection coils, wherein the signals induced in the two detection coils by the electromagnetic test field compensate for each other;

a foreign object detector circuit coupled to the two detection coils, wherein the foreign object detector circuit is arranged to detect a foreign object in response to a property of an output signal, wherein the output signal is from the two detection coils;

wherein the output signal meets a foreign object detection criterion;

a communication antenna;

a communicator circuit coupled to the communication antenna, wherein the communicator circuit is arranged to communicate with a power receiver via the communication antenna;

wherein the communication antenna comprises at least a first communication coil and a second communication coil, wherein first communication coil has a first coupling to the first detection coil, wherein second communication coil has a second coupling to the second detection coil, wherein the first coupling and the second coupling is at least one of capacitive couplings and inductive couplings, wherein the first coupling and the second coupling at least partially compensate for each other in the output signal.

2. The power transmitter of claim 1, wherein the first communication coil and the second communication coil are coupled in parallel.

3. The power transmitter of claim 1, wherein the first coupling comprises a capacitive coupling and an inductive coupling, wherein the second coupling comprises a capacitive coupling and an inductive coupling.

4. The power transmitter of claim 1, wherein a first signal component induced in the first detection coil from a current in the first communication coil is compensated in the output signal by a second signal component induced in the second detection coil from a current in the second communication coil.

5. The power transmitter of claim 1, wherein a current direction in the first segment relative to a current direction in the first detection coil is opposite a current direction in the second segment relative to a current direction in the second detection coil.

6. The power transmitter of claim 1, wherein a spatial relationship between the first communication coil and the first detection coil corresponds to a spatial relationship between the second communication coil and the second detection coil.

7. The power transmitter of claim 1, wherein a voltage potential for the first segment matches a voltage potential for the second segment.

8. The power transmitter of claim 1, wherein the first communication coil and the second communication coil have substantially identical spatial configurations, wherein the first segment and second segment are corresponding segments of the first detection coil and the second detection coil.

9. The power transmitter of claim 1, wherein the two detection coils are formed in a first plane, wherein the communication coils are planar coils, wherein the communication coils are formed in a second plane, wherein the second plane is substantially parallel to the first plane.

10. The power transmitter claimed in claim 9, wherein the first detection coil spans a first area in the first plane, wherein the second detection coil spans a second area in the first plane, wherein an orthogonal projection of the first segment on the first plane has a same spatial relationship relative to the first area as a spatial relationship of an orthogonal projection of the second segment on the first plane relative to the second area.

11. The power transmitter claimed in claim 9, wherein the first detection coil spans a first area in the first plane, wherein the second detection coil spans a second area in the first plane, wherein an orthogonal projection of the first communication coil onto the first area is substantially similar to an orthogonal projection of the second communication coil onto the second area.

12. The power transmitter of claim 9, wherein the first detection coil and the second detection coil are rotationally symmetric around a rotation point, wherein the first segment and the second segment are rotationally symmetric around the rotation point.

13. The power transmitter of claim 9, comprising a plurality of sets of balanced detection coils, wherein each set of balanced detection coils comprises at least two detection coils, wherein each of the at least two detection coils in each set of balanced detection coils is rotationally symmetric around a rotation point, wherein each detection coil of any of the plurality of sets of balanced detection coils spans an angular interval, wherein each of the first communication coil and the second communication coil comprises segments distributed along concentric closed curves surrounding the rotation point, wherein each of the first communication coil and the second communication coil are symmetric around the rotation point between angular intervals of detection coils of one the sets of balanced detection coils, wherein segments within an angular interval spanned by one detection coil of at least one set of the plurality of balanced detection coils, wherein the two detection coils are rotationally symmetric with segments within an angular interval spanned by another detection coil of any of the plurality of sets balanced detection coils.

14. The power transmitter of claim 13, wherein each angular interval comprises a plurality of segments distributed along different closed curves for each of the first communication coil and the second communication coils.

15. The power transmitter of claim 13, wherein different segments of adjacent angular intervals are distributed along different curves of the concentric closed curves.

16. A method comprising:

providing a transmitter coil, wherein the transmitter coil is arranged to generate an electromagnetic test field;

providing two detection coils, wherein signals induced in the two detection coils by the electromagnetic test field compensate each other;

providing a foreign object detector circuit coupled to the two detection coils, wherein the two detection coils are arranged to perform foreign object detection, wherein the foreign object detector circuit is arranged to detect a foreign object in response to a property of an output signal, wherein the output signal is produced by the two detection coils meeting a foreign object detection criterion;

providing a communication antenna; and providing a communicator circuit coupled to the communication antenna, wherein the communicator circuit is arranged to communicate with a power receiver via the communication antenna;

wherein the communication antenna comprises at least a first communication coil and a second communication coil, wherein the first communication coil and the second communication coil are coupled in parallel with the first communication coil, wherein the communication antenna is arranged with a first segment of the first communication coil having a first capacitive coupling to the first detection coil, wherein the communication antenna is arranged with a second segment of the second coil having a second capacitive coupling to the second detection coil, wherein the first coupling and the second coupling is at least one of a capacitive couplings and inductive couplings, wherein the first coupling and the second coupling compensating each other in the output signal.

17. The method of claim 16, wherein the first communication coil and the second communication coil are coupled in parallel.

18. The method of claim 16, wherein the first coupling comprises a capacitive coupling and an inductive coupling, wherein the second coupling comprises a capacitive coupling and an inductive coupling.

19. The method of claim 16, wherein a first signal component induced in the first detection coil from a current in the first communication coil is compensated in the output signal by a second signal component induced in the second detection coil from a current in the second communication coil.

20. The method of claim 16, wherein a current direction in the first segment relative to a current direction in the first detection coil is opposite a current direction in the second segment relative to a current direction in the second detection coil.

21. The method of claim 16, wherein a spatial relationship between the first communication coil and the first detection coil corresponds to a spatial relationship between the second communication coil and the second detection coil.

22. The method of claim 16, wherein a voltage potential for the first segment matches a voltage potential for the second segment.

23. The method of claim 16, wherein the first communication coil and the second communication coil have substantially identical spatial configurations, wherein the first segment and second segment are corresponding segments of the first detection coil and the second detection coil.

24. The method of claim 16, wherein the two detection coils are formed in a first plane, wherein the communication coils are planar coils, wherein the communication coils are formed in a second plane, wherein the second plane is substantially parallel to the first plane.

25. The method of claim 24, wherein the first detection coil spans a first area in the first plane, wherein the second detection coil spans a second area in the first plane, wherein an orthogonal projection of the first segment on the first plane has a same spatial relationship relative to the first area as a spatial relationship of an orthogonal projection of the second segment on the first plane relative to the second area.

26. The method of claim 24, wherein the first detection coil spans a first area in the first plane, wherein the second detection coil spans a second area in the first plane, wherein an orthogonal projection of the first communication coil onto the first area is substantially similar to an orthogonal projection of the second communication coil onto the second area.

27. The method of claim 24, wherein the first detection coil and the second detection coil are rotationally symmetric around a rotation point, wherein the first segment and the second segment are rotationally symmetric around the rotation point.

28. A non-transitory computer-readable medium, comprising a computer program that, when executed on a processor, causes the processor to perform the method as claimed in claim 16.

* * * * *